(12) United States Patent
Takao et al.

(10) Patent No.: US 6,578,200 B1
(45) Date of Patent: Jun. 10, 2003

(54) DATA TRANSMISSION/RECEPTION APPARATUS FOR USE IN A TWO-WAY DIGITAL BROADCASTING SYSTEM

(75) Inventors: Naoya Takao, Kadoma (JP); Hisayuki Kino, Nara-ken (JP); Masahiro Oashi, Hirakata (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 08/961,654

(22) Filed: Oct. 31, 1997

(30) Foreign Application Priority Data

Oct. 31, 1996  (JP) .............................................. 8-290901

(51) Int. Cl.⁷ .......................... H04N 5/445; G06F 3/00; G06F 13/00
(52) U.S. Cl. ........................... 725/54; 725/91; 725/105; 725/114; 725/118; 709/231; 709/232
(58) Field of Search ........................ 725/54, 105, 118, 725/131, 148, 151, 61, 91, 114; 709/230–234

(56) References Cited

U.S. PATENT DOCUMENTS 5,822,524 A  * 10/1998  Chen et al. ............ 395/200.33
5,943,047 A  *  8/1999  Suzuki ........................ 345/327
6,169,570 B1 *  1/2001  Suzuki ......................... 348/13

* cited by examiner

*Primary Examiner*—Andrew Faile
*Assistant Examiner*—Ngoc Vu

(57) ABSTRACT

The reception device in two way digital broadcasting system sends a transmission request for an object via a control channel of a network to a server device that stores a plurality of objects. This plurality of objects includes at least one object that contains data and at least one object that contains a control instruction for a synchronous transmission request requesting the transmission of data that is presently required or an asynchronous transmission request requesting the transmission of data that will probably be necessary in the future. The reception device receives the requested object via the data channel of the network. On receiving an object that includes a control instruction for a synchronous transmission request or an asynchronous transmission request from the server device, the reception device decodes the control instruction in the received object and judges whether a synchronous transmission request or an asynchronous transmission request is to be issued. When a synchronous transmission request is issued, the reception device does not decode another instruction until the requested object arrives. On the other hand, when an asynchronous transmission request is issued, the reception device does not wait for the requested object to arrive before decoding another instruction.

31 Claims, 16 Drawing Sheets

Fig. 8

401
DSM_Stream_play( "/Movie/Apollo30" ,00:00:00,00:05:15)

402
DSM_Directory_get( "/Startup/Startup/page1" )

DATA TRANSMISSION/RECEPTION APPARATUS FOR USE IN A TWO-WAY DIGITAL BROADCASTING SYSTEM

BACKGROUND OF THE INVENTION

1. Field of the Invention

The present invention relates to a two-way digital broadcasting system composed of a server apparatus that stores data and a data reception terminal apparatus that requests data transmission and performs data reproduction, where the apparatuses are connected by a network.

2. Description of the Prior Art

FIG. 1 is a representation of a conventional two-way digital broadcasting system. As shown in FIG. 1, a conventional two-way digital broadcasting system is composed of a server apparatus A that stores objects that are made up of data, such as video data and audio data, and control instructions, a plurality of data reception terminals B which request the transmission of objects from the server apparatus A and receive such transmission, and a network C that connects the server apparatus A to the data reception terminals B. Here, it is normal for the server apparatus A and each data reception terminal B to be connected by one data channel for transmitting a single data stream on the network C and one control channel for transmitting control information on the network C.

The following is a simplified explanation of the operation of the conventional two-way digital broadcasting system described above. First, a transmission request for an object is sent from a data reception terminal B to the server apparatus A via the control channel of the network C. In this specification, an "object" refers to a collection of data in order to fulfill a specific function or purpose, and has a wide definition that includes control instructions as one type of data. On receiving the transmission request, the server A searches for the requested object and on finding it sends the corresponding data to the data terminal apparatus B via a data channel of the network C. This operation is repeated whenever new data is requested by the data reception terminal B. These object transmission requests for objects are issued by a data reception terminal B in accordance with indications from the user and control instructions included in received objects.

In the conventional two-way digital broadcasting system described above, the object whose transmission is requested is an object which is required immediately, so that the data reception terminal is unable to commence the following process from the time the transmission request is issued until the time the requested object is received. When the data reception terminal requests the transmission of new data, time is needed for the server A to search for the requested object before transmission, so that there are many cases where the data reception terminal has to wait a considerable amount of time before the new data arrives, which can be frustrating for users.

Depending on the content of the received data, there are cases where the data which will be requested next can be predicted with a high probability. Accordingly, to eliminate the waiting time required for the next data to arrive, ti would be possible for the data reception terminal to issue a transmission request beforehand for the predicted next set of data and then receive the data, enabling the data reception terminal to display the received data instantly where required.

However, in a two-way digital broadcasting system, it is normal for a server apparatus to transmit data to a data reception terminal on a data channel which is a single stream, so that if the preloading of a next set of data is performed unrestrictedly, there is the risk of interrupting the transmission of the data which is currently necessary. There are also problems such as that data will still be preloaded even when it becomes clear after requesting the transmissions of the data that the data is no longer necessary.

Since data is transmitted on a data channel that is a single stream, conventional systems have had a problem that when data, such as video data or audio data, whose transmission requires a significant amount of time is presently being transmitted and a transmission request is given for a next set of data, this data will not be transmitted until the transmission of the present data is completed, so that the data reception terminal will not be able to obtain the next data quickly in spite of the need to do so.

When it is known beforehand that a given object needs to be transmitted together with another object, it is conventional for the two objects to be combined into a large object which is then stored in the server and transmitted on request, or alternatively for a separate transmission request to be issued and executed for each of the two objects. With the former method, there is the problem that when the other object for a given object itself needs to transmitted together with yet another object, it becomes necessary to further combine this object and store the resulting file in the server. This leads to wasteful use of the storage capacity of the server and makes the management necessary when amending and adding objects extremely complex. On the other hand, with the latter method, while the storage capacity is not put to waste, it becomes necessary to execute two transmission requests, which increases the time taken by the transmission of objects.

SUMMARY OF THE INVENTION

The present invention was conceived in view of the stated problems, and has an object of reducing the time taken by data reception in response to an object transmission request in a two-way digital broadcasting system and of appropriately managing transmission requests and the present reception status.

The stated objects can be achieved by performing the procedure described below in a system with the following construction. A server apparatus stores a plurality of objects including at least one object that contains data and one object that contains a synchronous transmission request for issuing a transmission request for an object that is presently required and an asynchronous transmission request for issuing a transmission request for an object that has a high probability of becoming necessary in the future. The server apparatus is sent a transmission request for an object via a control channel of a network and sends the requested object via the data channel of the network.

In the procedure of the present invention, an object including control instructions that can be a synchronous transmission request or an asynchronous transmission request is received from the server apparatus. A control instruction in the received object is decoded, and it is judged whether a synchronous transmission request or an asynchronous transmission request is to be executed. When a synchronous transmission request is to be executed, a transmission request for an object is issued and decoding of a next instruction is not performed until the requested object has been received. On the other hand, when an asynchronous transmission request is to be executed, a transmission request for an object is issued and decoding of a next instruction is performed regardless of whether the request object has been received or not.

By performing the procedure described above, objects which are presently required will definitely be received and processed, while objects with a high probability of being required in the future will also be obtained in advance, so that when such objects become necessary in the future, the system will be able to instantly process the objects. Here, there is the additional effect of the asynchronous transmission requests not interrupting the other processes.

It is desirable for the procedure to be performed as described below when an object in the plurality of objects includes at least one of video data and audio data.

First, it is judged whether an object received by the object receiving unit includes vide data/audio data or other data, with video data being outputted to a video/audio reproduction unit and other data being outputted to a data storage unit.

By handling video/audio data and other data in this way, the different control methods for transmission requests can be used depending on whether video/audio data whose reception time is considerable is being received, on whether an object that contains video/audio data is to be transmitted or on whether an object that contains other data is to be transmitted. By doing so, more flexible transmission requests can be used, resulting in a more flexible reproduction process for objects.

In more detail, when a control instruction or a user indication is decoded and a synchronous transmission request is to be executed while video data or audio data is being outputted, a transmission termination request for the present object is first transmitted to the server apparatus.

With the above operation, when the data channel of the network is busy due to the transfer of video data or audio data, the transmission of the object that includes this video data or audio data is terminated, so that the reception of the object indicated by the synchronous transmission request which is presently required can be quickly performed, reducing the time taken by the processing as a whole.

When a control instruction or a user indication is decoded and an asynchronous transmission request is to be executed while video data or audio data is being outputted, the asynchronous transmission request is not performed.

By doing so, the reception of the video/audio data that is presently being reproduced is given priority and continued, while the asynchronous transmission request for the object that is likely to be needed in the future is not executed, thereby avoiding any interruptions to the reproduction of the video/audio data which would frustrate the user.

When an asynchronous transmission request has been issued for an object but the requested object has not yet arrived and, on decoding a user indication or a control instruction, a transmission request should be issued for an object including at least one of video data and audio data, a transmission termination request is first issued for the requested object of the asynchronous transmission request.

By doing so, the transmission of the object of the asynchronous transmission request which is not presently required is canceled and the object containing the video data or audio data that is presently required is received instead, meaning that the transmission of presently required objects is not interrupted by the transmission of objects which are not presently required.

When a first asynchronous transmission request has been issued for an object but the requested object has not yet arrived and, on decoding one of a user indication and a control instruction, a second asynchronous transmission request should be issued, a transmission termination request is first issued to the server apparatus for the requested object of the first asynchronous transmission request.

By doing so, the reception of an object that is likely to be needed in the future due to a latest asynchronous transmission request is not delayed by the transmission of an object requested by a preceding asynchronous transmission request.

When an asynchronous transmission request for an object has been issued to the server apparatus but a requested object has not yet arrived and, on decoding one of a user indication and a control instruction, a transmission request should be issued for an object that includes at least one of video data and audio data, the transmission request is not issued to the server apparatus until the requested object of the asynchronous transmission request has arrived.

By doing so, the object of the asynchronous transmission request can be received before the data channel becomes busy with the transfer of the video data or audio data whose reception time is very long.

It is also possible for objects to be received via the control channel of the network, so that when video data or audio data is being outputted and a transmission request for an object is issued, the object requested by the transmission request can be received via the control channel of the network.

By doing so, when the data channel is busy with the transfer of the video data or audio data, objects can be received via the control channel of the network.

The stated object of the present invention can be achieved by a server apparatus connected via network to a data reception terminal. This server apparatus stores a plurality of objects and when the server apparatus is transmitting video data and audio data to the data reception terminal apparatus and the data reception terminal apparatus gives issues a transmission request for an object, the server apparatus sends the object requested by the transmission request to the data reception terminal apparatus via the control channel of the network.

By doing so, when the data channel is busy with the transmission of video data or audio data to the data reception terminal apparatus, an object requested by a transmission request can be transmitted to the data reception terminal apparatus using the control channel.

The server apparatus of the present apparatus is also such that an object that includes list information showing other objects that are to be simultaneously transmitted with the object can also be stored in the server apparatus. When there is a transmission request for an object that includes list information, the server apparatus searches for the other objects given in the list information and also transmits these objects to the data reception terminal apparatus.

By doing so, there is no need to combine objects that are simultaneously necessary into large files, and a same file can be indicated in the list information of multiple objects, so that improvements are made in the efficiency of the use of the data storage unit of the server apparatus. There is also no need to use a plurality of transmission requests for a plurality of objects, increasing the speed at which the requested objects can be transmitted.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 8 shows examples of the instruction statements in a transmission request;

DESCRIPTION OF THE PREFERRED EMBODIMENT

The following is a description of an embodiment of the present invention, with reference to the drawings.

Figure 1:
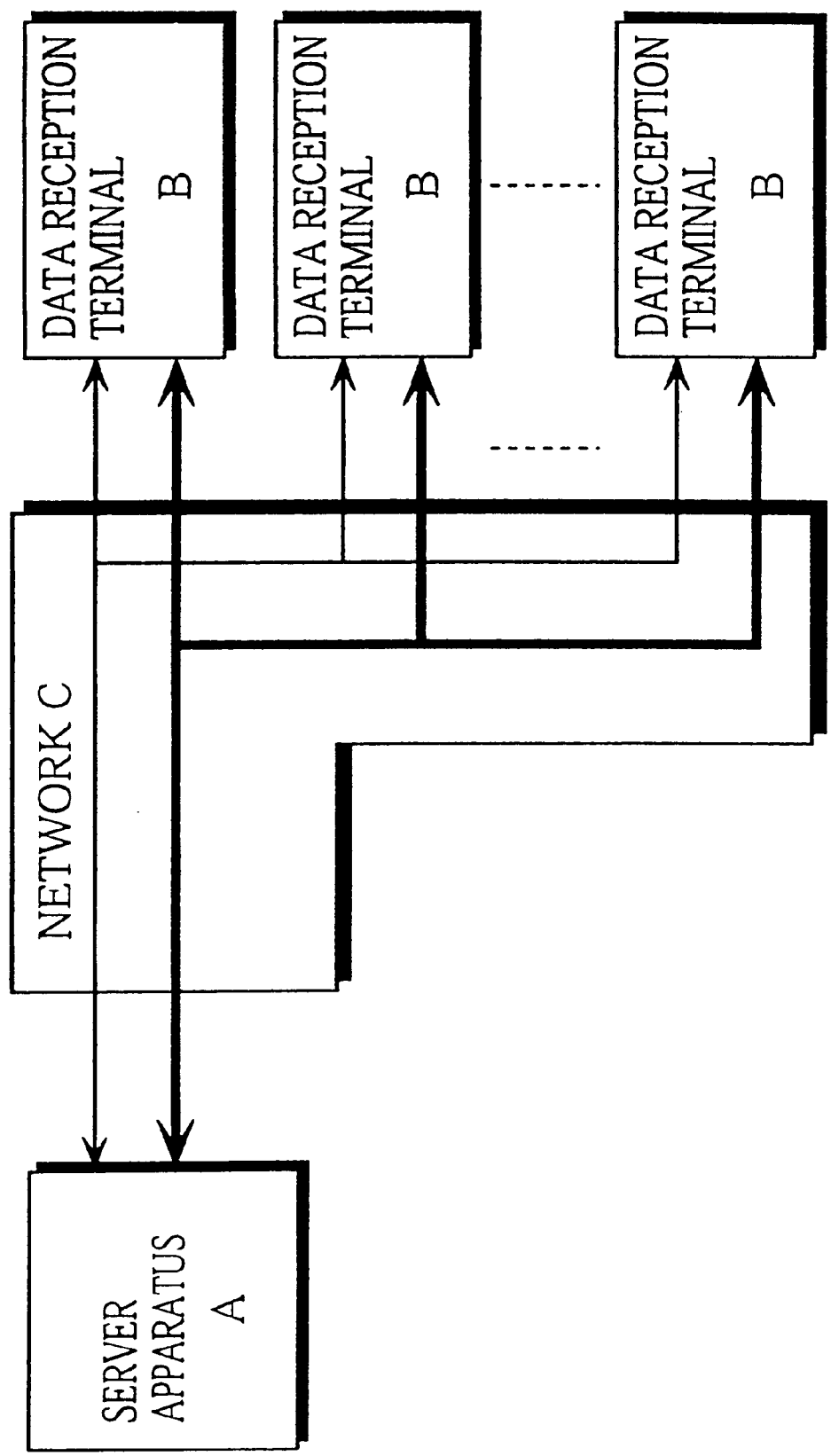
FIG. 1 shows the overall construction of a conventional two-way digital broadcasting system.
Figure 2:
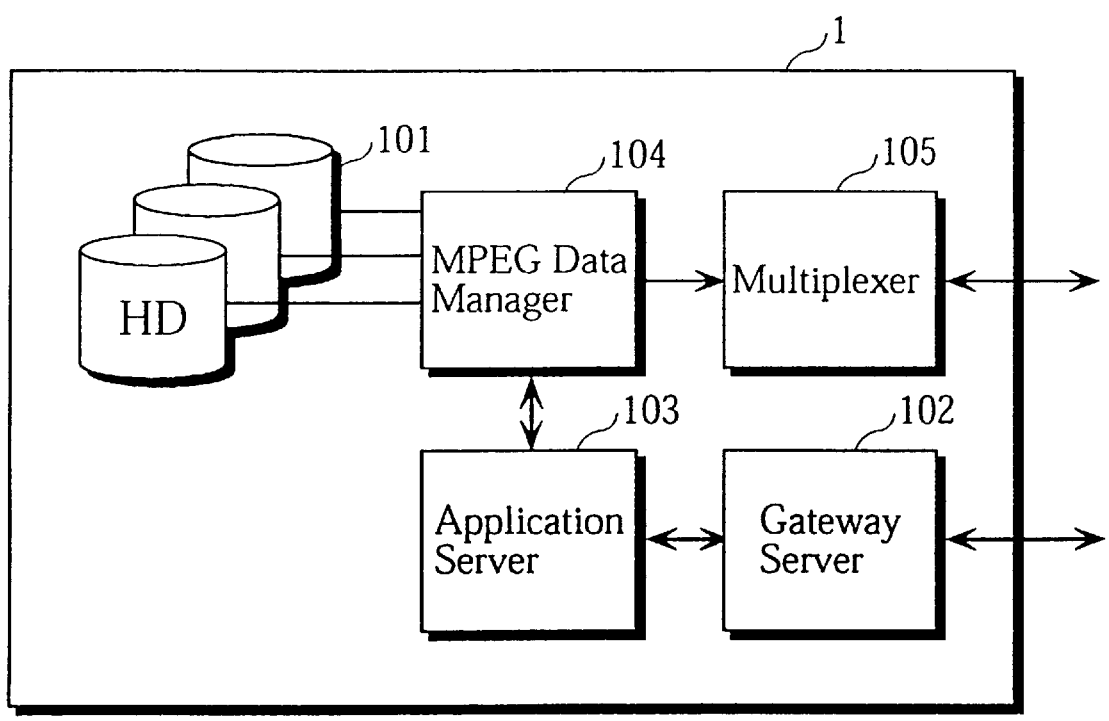
FIG. 2 shows the hardware construction of the server apparatus of an embodiment of the present invention.
Figure 3:
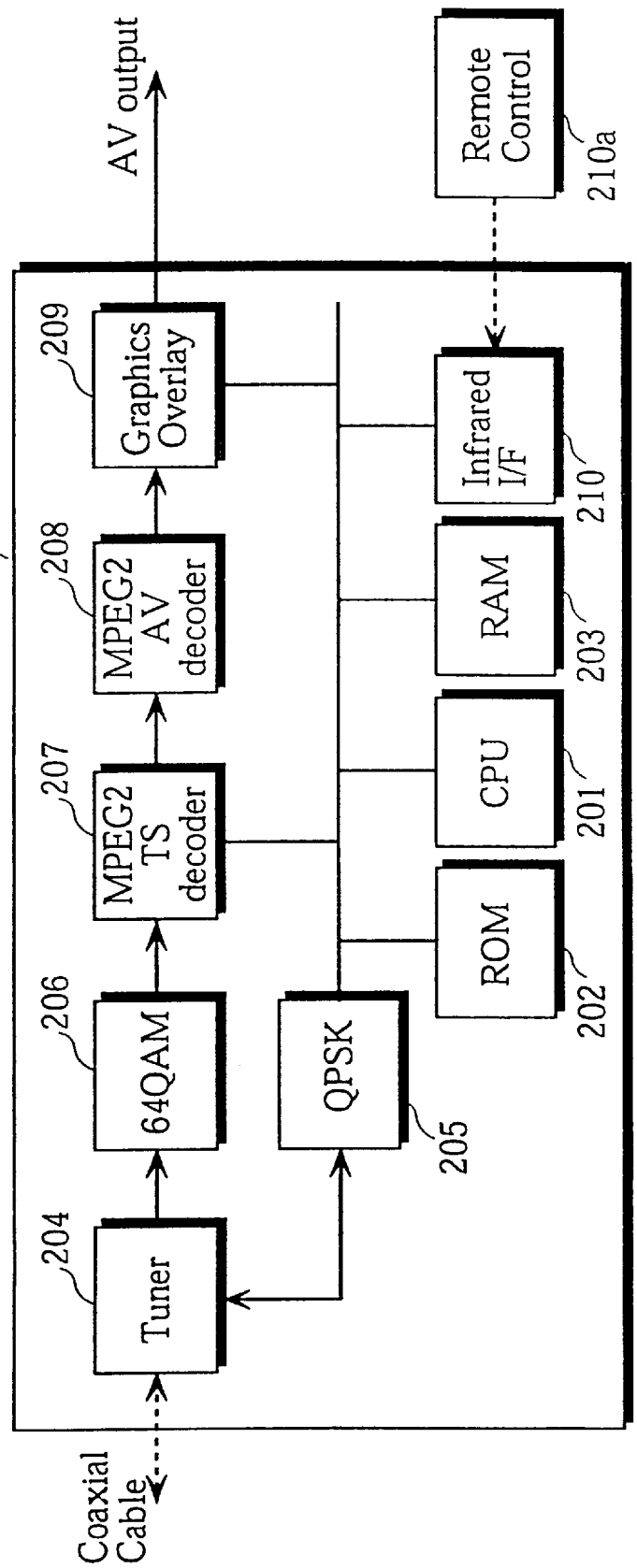
FIG. 3 shows the hardware construction of the data reception terminal in the present embodiment.

The hardware construction of the two-way digital broadcasting system to which the present embodiment relates is shown in FIGS. 2 and 3. FIG. 2 is a block diagram showing the hardware construction of the server apparatus 1 in the present two-way digital broadcasting system. This server apparatus 1 is composed of a large capacity hard disc drive 101, a gateway server 102 that processes control signals transmitted to or received from a reception terminal, an application server 103 which performs a variety of operations and generates control signals to be transmitted based on the received controls signals, an MPEG data manger 104 that searches for MPEG data recorded on the hard disc drive 101 at high speed, and a multiprocessor 105 that performs signal processing for transmitting a data signal to the data terminal. It should be noted here that the application server 103 and the gateway server 102 are composed of a CPU that performs computation, a RAM that provides the work area for the CPU, and a ROM that stores a program and other data, while the MPEG data manager 104 and the multiprocessor 105 are achieved using well-known hardware boards.

FIG. 3 is a block diagram showing the hardware construction of the data reception terminal 2 in the present two-way digital broadcasting system. This data reception terminal 2 is composed of a CPU 201 that performs computation, a ROM 202 that stores a control program and other data, a RAM 203 that stores data, a tuner 204 that transmits and receives control signals to or from the server apparatus 1 and receives the data signal, a QPSK 205 that modules the transmitted control signals and demodulates the received control signals, a 64QAM 206 that demodulates the received data signal at high speed, an MPEG2/TS decoder 207 that determines the type of a received object, an MPEG2/AV decoder 208 that decodes AV data that has been compressed according to MPEG2 standard, a graphics overlay 209 that combines the video data and graphics data that are to be reproduced, and an infrared I/F 201 that receives user indications by receiving infrared signals issued by a remote controller 210a that is manipulated by the user.

Figure 4:
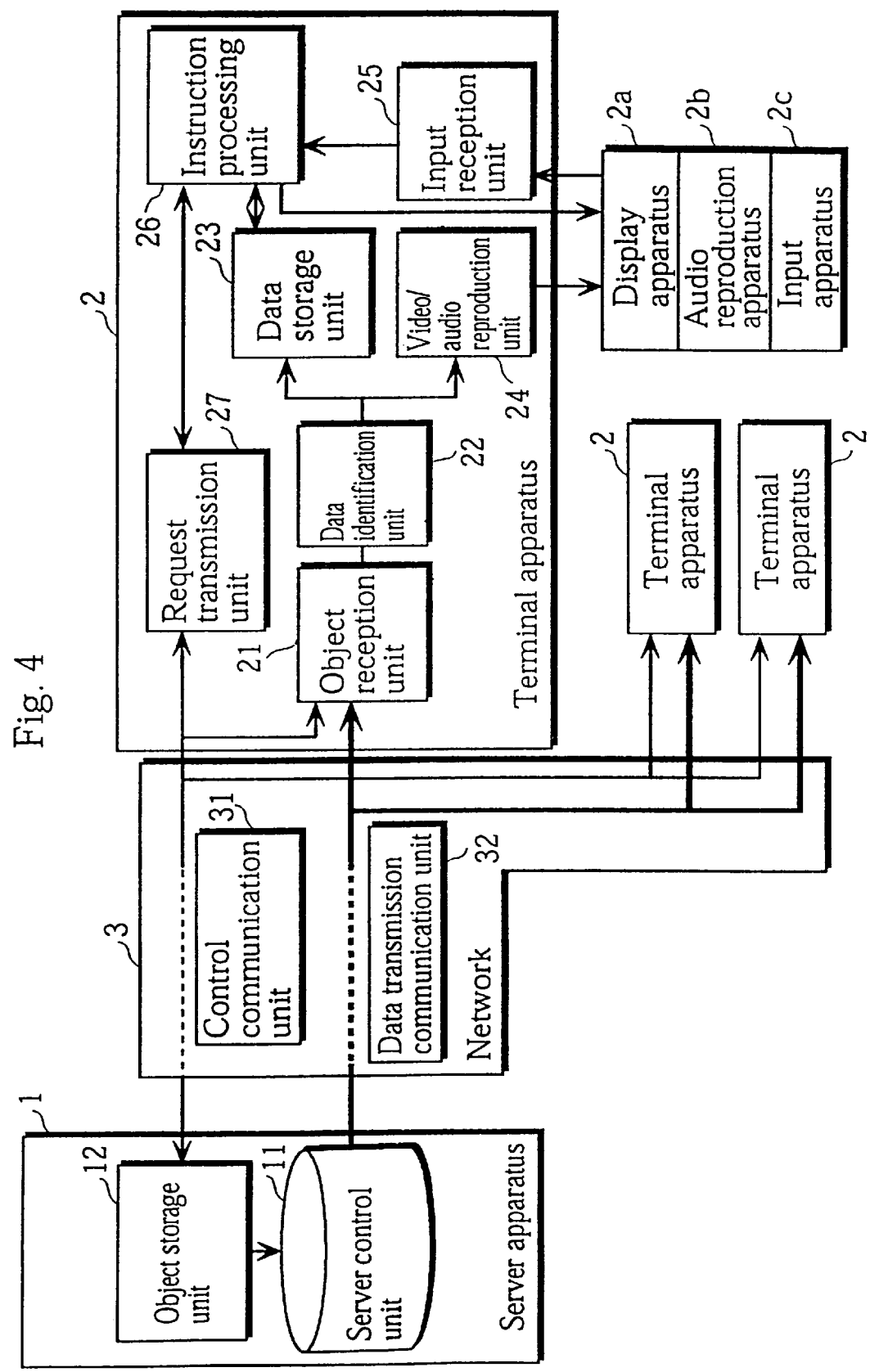
FIG. 4 shows the overall construction of the two-way digital broadcasting system of the present embodiment.

The overall construction of the two way digital broadcasting system composed of this server apparatus 1 and this data reception terminal 2 is shown in functional terms in FIG. 4. As shown in FIG. 4, the present digital broadcasting system is composed of a server apparatus 1, several data reception terminals 2 and a network 3. Each data reception terminal 2 is connected to a display apparatus 2a, an audio reproduction apparatus 2b, and an input apparatus 2c.

The following is a detailed description of the various components of the present system. The server apparatus 1 is composed of an object storage unit 11 and a server control unit 12. The object storage unit 11 is composed of a large capacity hard disc drive 101, and stores objects composed of video/audio stream data in MPEG format (hereinafter referred to as "AV data"), and objects composed of data (hereinafter referred to as "private data") such as graphics, audio data in a non-MPEG2 format (such as PCM format), page data, and control instructions.

Figure 5:
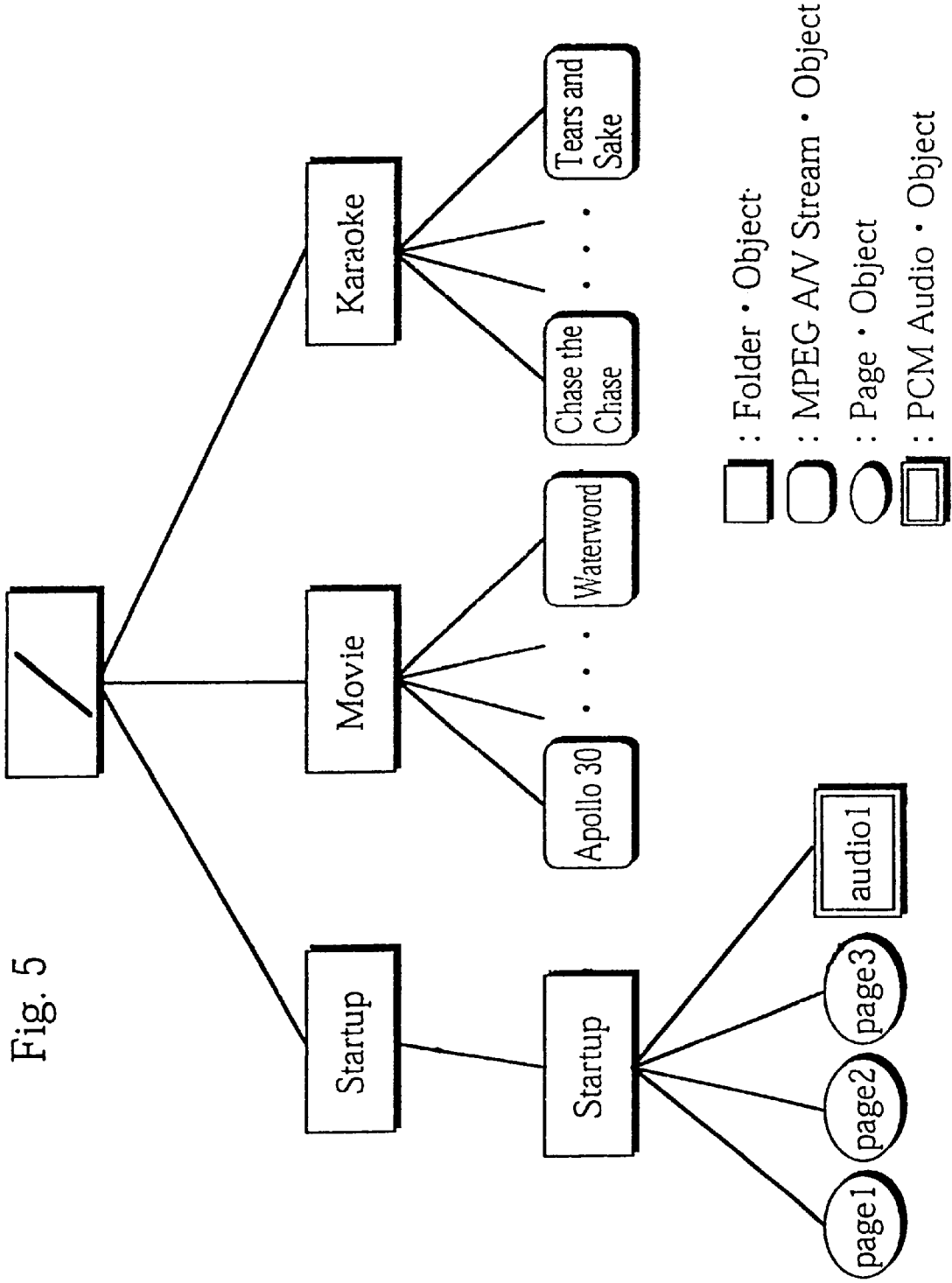
FIG. 5 shows the hierarchical structure used for recording data in the object storage unit.

Each set of data is stored as part of a hierarchy with its own service name, folder name, and object name, as shown in FIG. 5. An example of a stored object is given in FIG. 6. This example shows a "page object" that is an object for forming one display screen which is displayed on the display apparatus 2a having been outputted by the data reception terminal 2. Normally, page objects are composed of bitmap data 302 for graphics that are used for forming part of the display screen, attribute information data 302 showing the nature of the object, and control instruction data 303 which describes the behavior of the object. In this way, each object is composed of sets of data that have one or more functions, with these sets of data being grouped together in accordance with the producer's intention.

Figure 6:
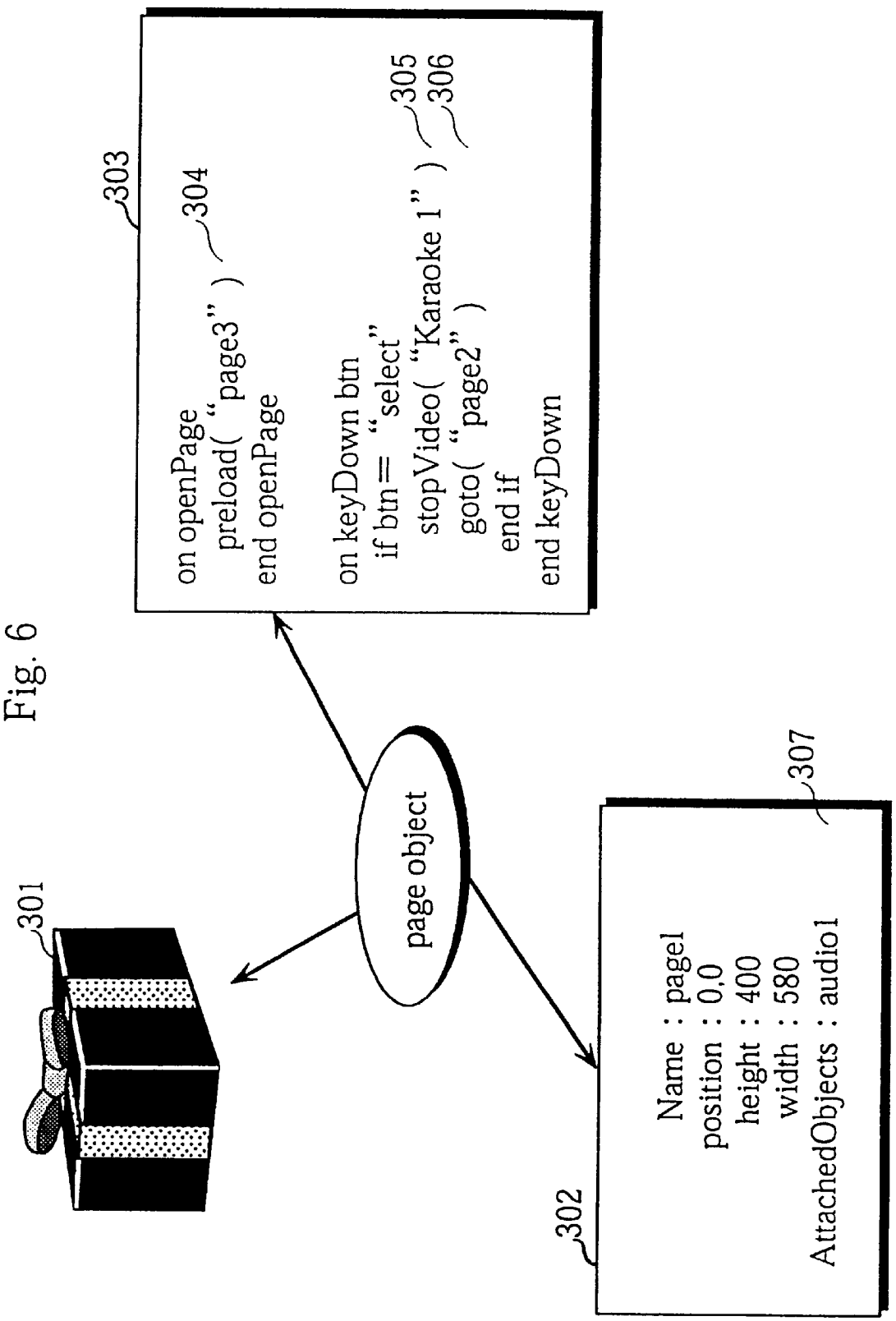
FIG. 6 shows an example of the data content of an object.

The control instruction 304 "preloaded ("page3")" in the control instruction data 303 in FIG. 6 is a control instruction which predicts that the object called "page 3" is required by the next process and so issues a transmission request so that the data can be stored beforehand in the data storage unit 23 during the processing of the page currently being displayed. Control instructions that request the transmission of objects which are not presently required but are predicted to become necessary in the future are called "asynchronous transmission requests" in this specification.

The control instruction 306 "qoto ("page2")" in the control instruction data 303 in FIG. 6 is a control instruction that gives a transmission request for the object "page2" which is presently required. Control instructions that request the transmission of objects which are presently required are called "synchronous transmission requests" in this specification.

As described above, control instructions include synchronous transmission requests and asynchronous transmission requests, with the instruction processing unit 26 (described later) of the data reception terminal 2 being set to discriminate whether a transmission request is a synchronous transmission request or an asynchronous transmission request from the type of instruction statement. it should be noted here that the control instruction 305 "stopVideo ("Karaoke 1")" in the control instruction data 303 in FIG. 6, is a request to terminate the transmission of the object "Karaoke 1", with the control instructions also including such transmission termination requests.

On the other hand, the entry "AttachedObjects:audio1" (307) in the attribute information data 302 of FIG. 6 is attribute data called "list information", and further indicates the object "audio1" as another object that is to be additionally transmitted as an attachment when there has been a transmission request for the present object. In this way, list information that indicates the objects (hereinafter referred to as "attached objects") that should be simultaneously transmitted when there has been a transmission request for a present object is also included in the attribute information data 302. Such attached objects are objects that are used together with the object to which they are attached, with the attachment of two or more attached objects being possible, and the inclusion of further attached objects as list information in the attribute information of an attached object also being possible.

Figure 7:
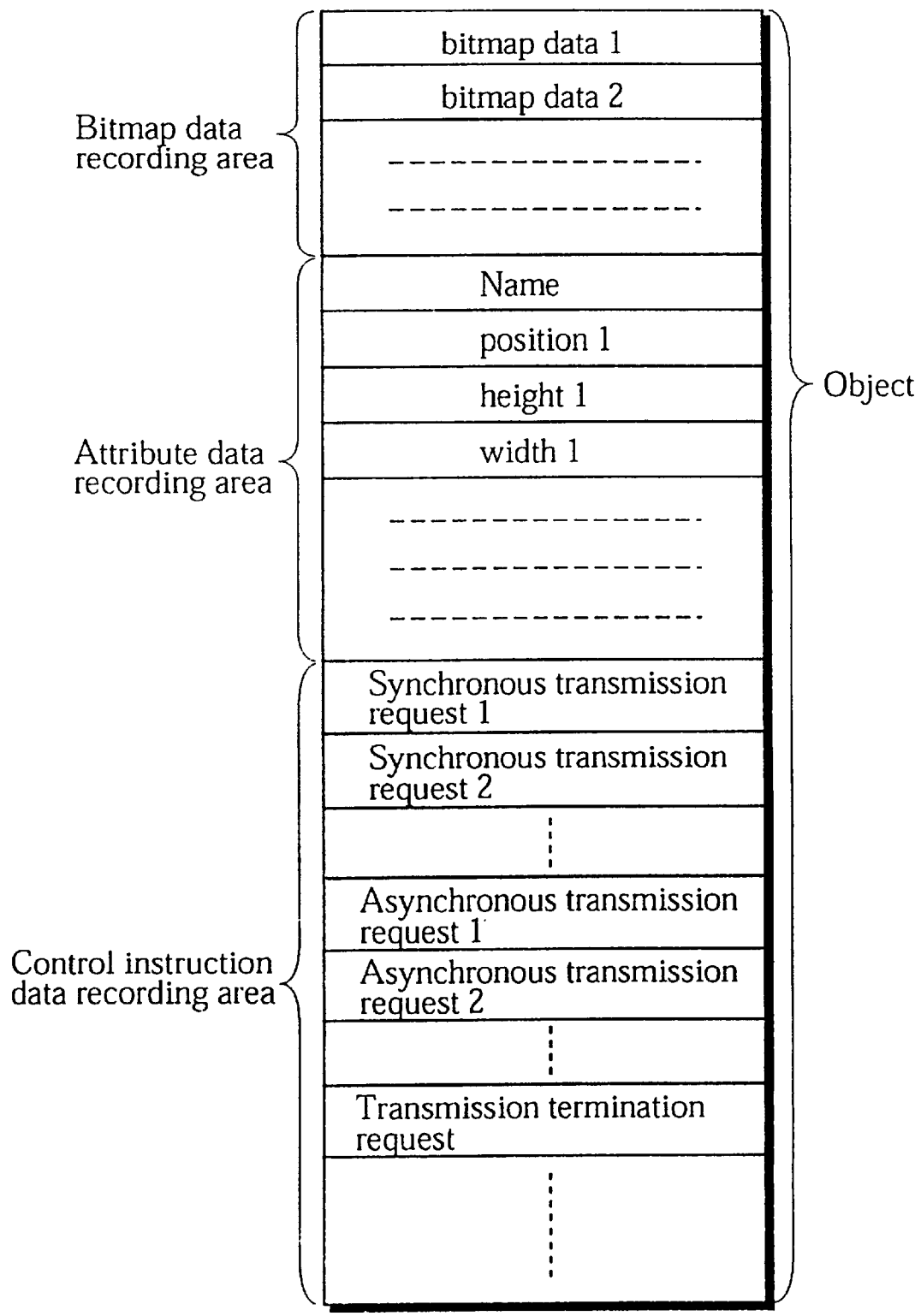
FIG. 7 shows an example of the data construction of an object.

FIG. 7 shows the data construction of an example object. As described above, the object data is composed of bitmap data, attribute information data, and control instruction data, so that each set of object data is composed of three areas for string these respective types of data. Here, a header is recorded at the start of each area to demarcate the areas.

The server control unit 12 searches for the requested object in the object storage unit 11, in accordance with the transmission request transmitted from the data reception terminal 2 via the control channel (described later) of the network 3, and on finding the object transmits it to the data reception terminal 2 via the data channel (described later) of the network 3. It should be noted here that the server control unit 12 can be realized by loading a specialized program for performing the functions described above and the operation procedure (described later) into a conventional personal computer or workstation, with it being possible for the program in question to be recorded on a recording medium such as a CD-ROM.

The data reception terminals 2 are each composed of an object reception unit 21, a data identification unit 22, a data storage unit 23, a video/audio reproduction unit 24, an input reception unit 25, an instruction processing unit 26, and a request transmission unit 27.

The object reception unit 21 receives the objects transmitted from the server apparatus 1 via the data channel of the network 3. However, the object reception unit 21 is also connected to the control channel of the network 3, and is also able to receive objects via this control channel. It should be noted here that the object reception unit 21 is constructed so as to be able to distinguish from the header of each set of data whether the data received via the control channel is control data or object data.

The data identification unit 22 is used to identify whether the data in the object received by the object reception unit 21 is AV data or other data, which is to say private data, and outputs AV data to the video/audio reproduction unit 24 and private data to the data storage unit 23.

The data storage unit 23 stores the data outputted by the data identification unit 22, and is realized using a rewritable storage device. This corresponds to the RAM 203. The video/audio reproduction unit 24 reproduces the AV data outputted by the data identification unit 22 and outputs it to the periphery. In general, AV data will be data that has been subjected to processing such as compression and scrambling, so that the video/audio reproduction unit 24 decompresses the compressed data and performs a descrambling process and a conversion to a television signal under NTSC or other such standard. After this, the reproduction data outputted by the video/audio reproduction unit 24 is actually reproduced as images and audio by the display apparatus 2a that is composed of a monitor or the like, and the audio reproduction apparatus 2b that can be composed of a decoding means and a speaker.

The input reception unit 25 receives the user indications via the input apparatus 2c. The input apparatus 2c uses the display apparatus 2a described above and a remote controller 210a to allow the user to input indications.

The instruction processing unit 26 decodes the control instructions in the data stored in the data storage unit 23 or the indications received from the input reception unit 25 and has the request transmission unit 27 issue transmission requests for objects. The instruction processing unit 26 also generates image data and outputs audio data under PCM or other such standard to the periphery. The outputted image data is displayed by the display apparatus 2a while the outputted audio data is outputted as actual audio by the audio reproduction apparatus 2b.

The instruction processing unit 26 judges whether the transfer requests in the control instructions described above are synchronous transmission requests or asynchronous transmission requests in accordance with the type of instruction statement. When the instruction processing unit 26 judges that the control instruction is a synchronous transmission request, it does not perform the next process until the object whose transmission has been requested has been received by the data reception terminal 2, or in more detail, until the object whose transmission has been requested has been received by the object reception unit 21. On the other hand, when the instruction processing unit 26 judges that the control instruction is an asynchronous transmission request, it performs the next process regardless of whether or not the object whose transmission was requested has been received by the object reception unit 21. The instruction processing unit 26 also performs a variety of processes in accordance with the transmission state, although these will be described later.

The request transmission unit 27 sends object transmission requests and transmission termination requests via the control channel of the network 3 to the server apparatus 1 in accordance with instructions from the instruction processing unit 26. It should be noted here that the transmission requests are sent using DSM-CC that is an ideal protocol to MPEG2 format. FIG. 8 shows an example of a transmission request sent according to DSM-CC protocol. The transmission request 401 on the first line of the figure is an example of request for the transmission of AV data, and is a request that indicates the name of the object in the hierarchy, and the absolute start time (hr:mn:ss) and absolute end time for the indicated object, and so requests the AV stream from the start of the "Apollo 30" stream for the service named "Movie" to the "00:05:15" point of the stream. The transmission request 402 on the second line of FIG. 8 is a request for the transmission of private data, and indicates the name of the object in the hierarchy, requesting the transmission of the object "page1" in the subfolder "Startup" in the folder "Startup".

It should be noted here that the data reception terminal 2 can be achieved by a conventional modem and a conventional computer that executes a program that achieves the functions and operation procedure described above, with it being possible to record the program in question onto a recording medium such as a floppy disc.

The network 3 includes a control communication unit 31 and a data transmission communication unit 32 and has a physical structure composed of optic fibre, coaxial cables, or the like, and a control part that performs transmission and modulation according to a predetermined communication protocol.

The control communication unit 32 is a communication path composed of a two-way control channel provided between the server apparatus 1 and each data reception terminal 2, and only needs to be able to perform digital communication at a baud rate in the region of several Kbps or more, with there being no particular limitations as to whether a cable or a wireless network is used, or as to which modulation method is used.

The data transmission communication unit 32 is a one-way communication circuit that transmits a large amount of multimedia data, which can include high quality video/audio such as MPEG2 format data, graphics, and even programs, from the server apparatus 1 to a data reception terminal 2. The data transmission communication unit 32 is assigned one stream as a data channel connecting each data reception terminal 2 and needs to be able to perform digital communication with a high transfer rate in the region of several Mbps or more.

The following is a description of the operation of the two-way digital broadcasting system composed of the server apparatus 1, the data reception terminals 2, and the network 3 described above.

First, the operation of the data reception terminal 2 will be described in accordance with a synchronous transmission request, an asynchronous transmission request, and with the present reception status. It should be noted here that when the communication lines between the server apparatus 1 and the data reception terminal 2 are initialized, the server apparatus 1 first transmits a page object α to the data reception terminal 2, with the data for this object being stored in the data storage unit 23. The instruction processing unit 26 then interprets the data stored in the data storage unit 23, and, as one example, has the screen shown in FIG. 9 displayed on the display apparatus 2a.

Figure 9:
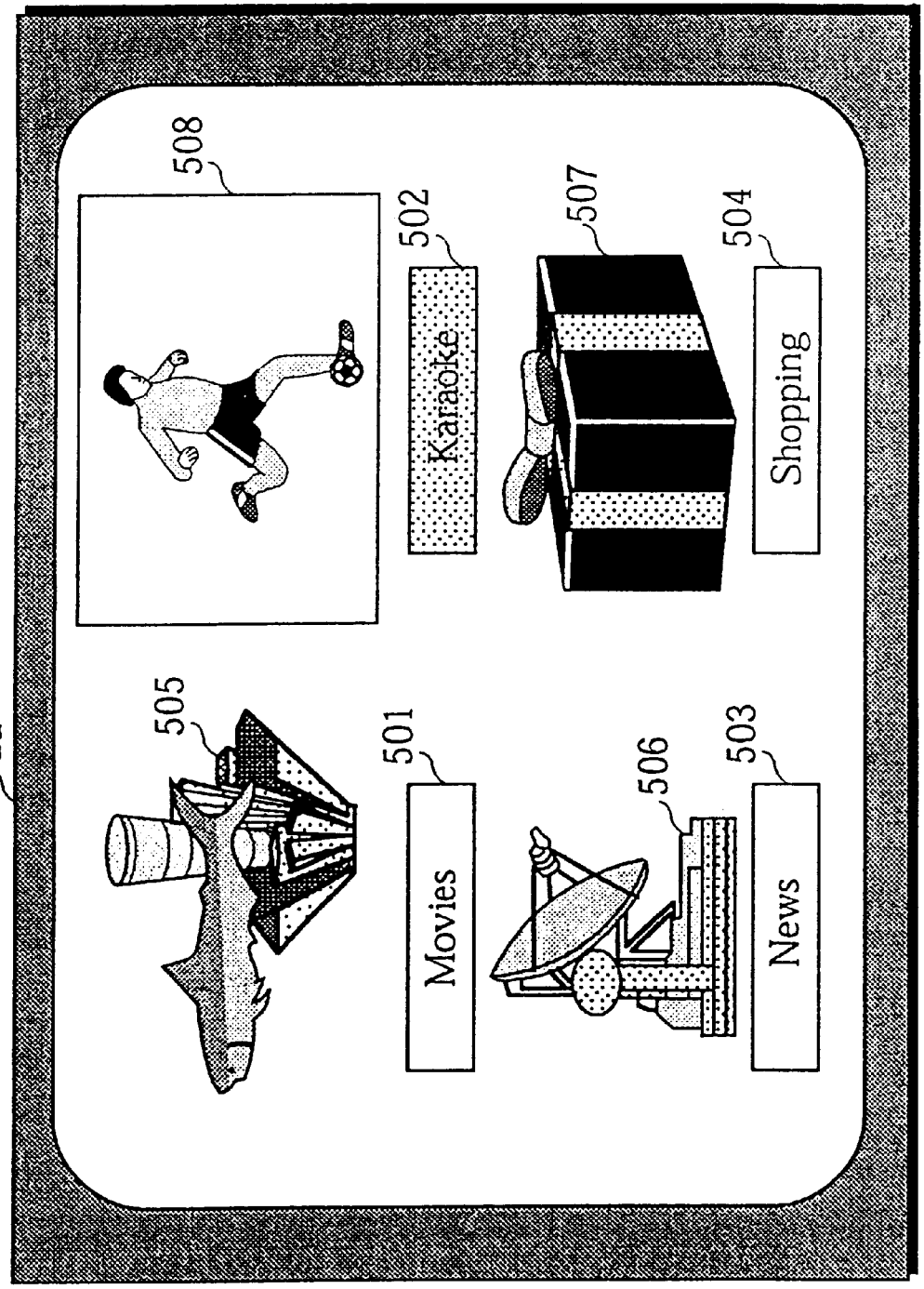
FIG. 9 shows an example screen that is displayed by the display apparatus based on a page object.

In the screen shown in FIG. 9, the character strings 501–504 are text objects which show the service names, still images 505–507 are graphic objects that are still images, and video 508 is reproduced video data that has been transmitted using MPEG2 format. It should be noted here that when the reproduction of the video data 508 comes to an end, a graphic object that is a still image may appear in its place. Using the remote controller 210a of the input apparatus 2c or the like, the user of the data reception terminal 2 can move a selection marker between the four service names "Movies", "Karaoke", "News", and "Shopping" (hereinafter, such operations are referred to by the word "select") and confirm a selection of a desired service (hereinafter "confirm").

Figure 10:
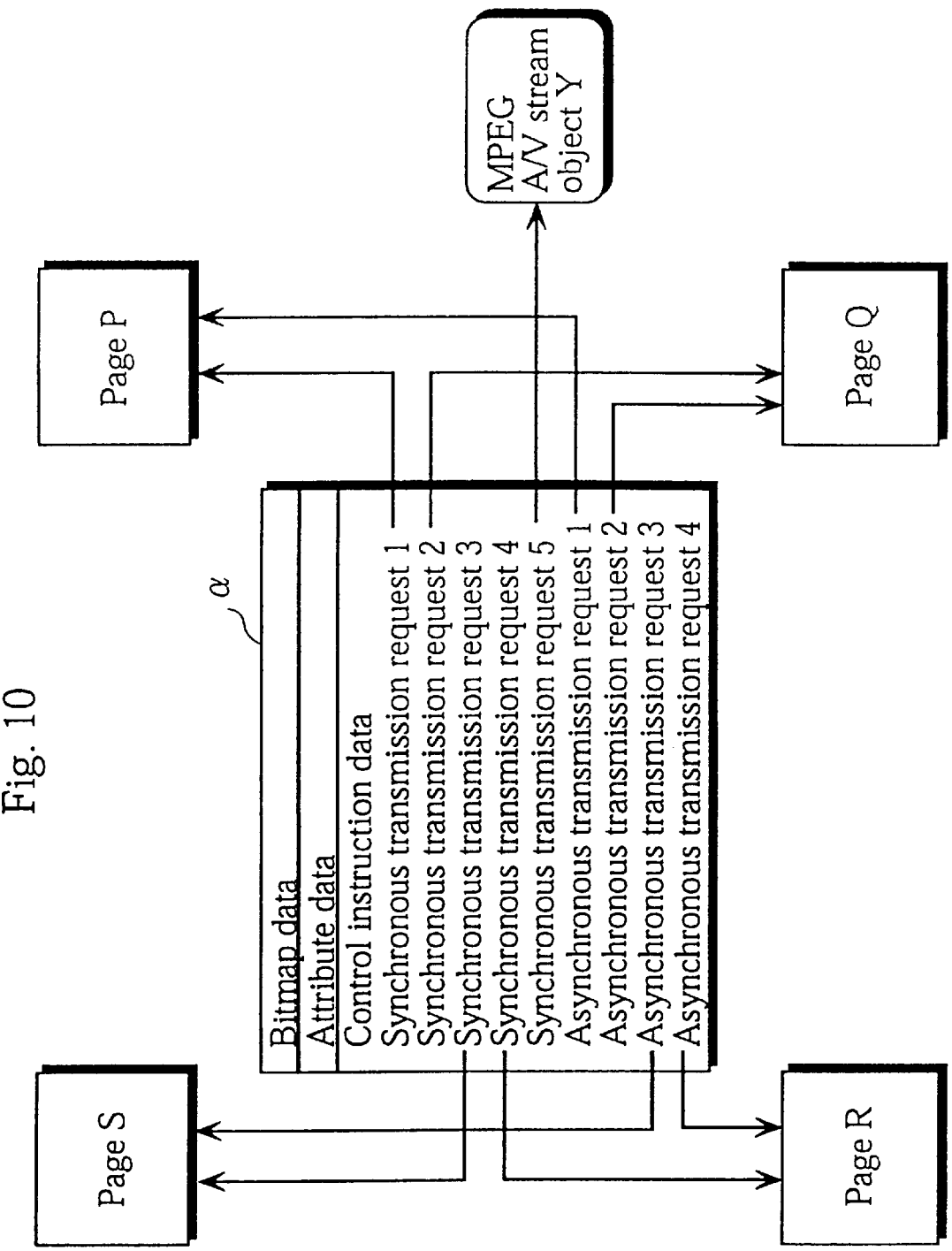
FIG. 10 shows the data construction of the page object shown in FIG. 9 and its relationship with the pages whose transmission can be requested from this page object.

In accordance with the selection marker and confirmation of a service, synchronous transmission requests and asynchronous transmission requests are executed. As shown in FIG. 10, the page object α displayed by the display apparatus 2a includes control instruction data made up of a plurality of control instructions (synchronous transmission requests 1–5) for issuing synchronous transmission requests, and a plurality of control instructions (asynchronous transmission requests 1–4) for issuing asynchronous transmission requests, with these control instructions being stored in the data storage unit 23.

In more detail, the asynchronous transmission requests 1–4 are control instructions that issue an asynchronous transmission request for a page object (Page P–S) that needs be transmitted if a service name that is currently selected out of the four service names "Movies", "Karaoke", "News", and "Shopping" is confirmed by the user.

The synchronous transmission requests 1–4 are control instructions that issue a synchronous transmission request for a page object (Page P–S) that should be transmitted when a service name has been confirmed by the user out of the four service names "Movies", "Karaoke", "News", and "Shopping". The synchronous transmission request 5 is a control instruction which, when the service name "Karaoke" has been selected, issues a synchronous transmission request for video data (MPEG AV stream data Y) for reproducing different video for "Karaoke" to the present video 508, after the asynchronous transmission request for an object that needs to be transmitted if the selected "Karaoke" service name is confirmed by the user has been issued.

Figure 11:
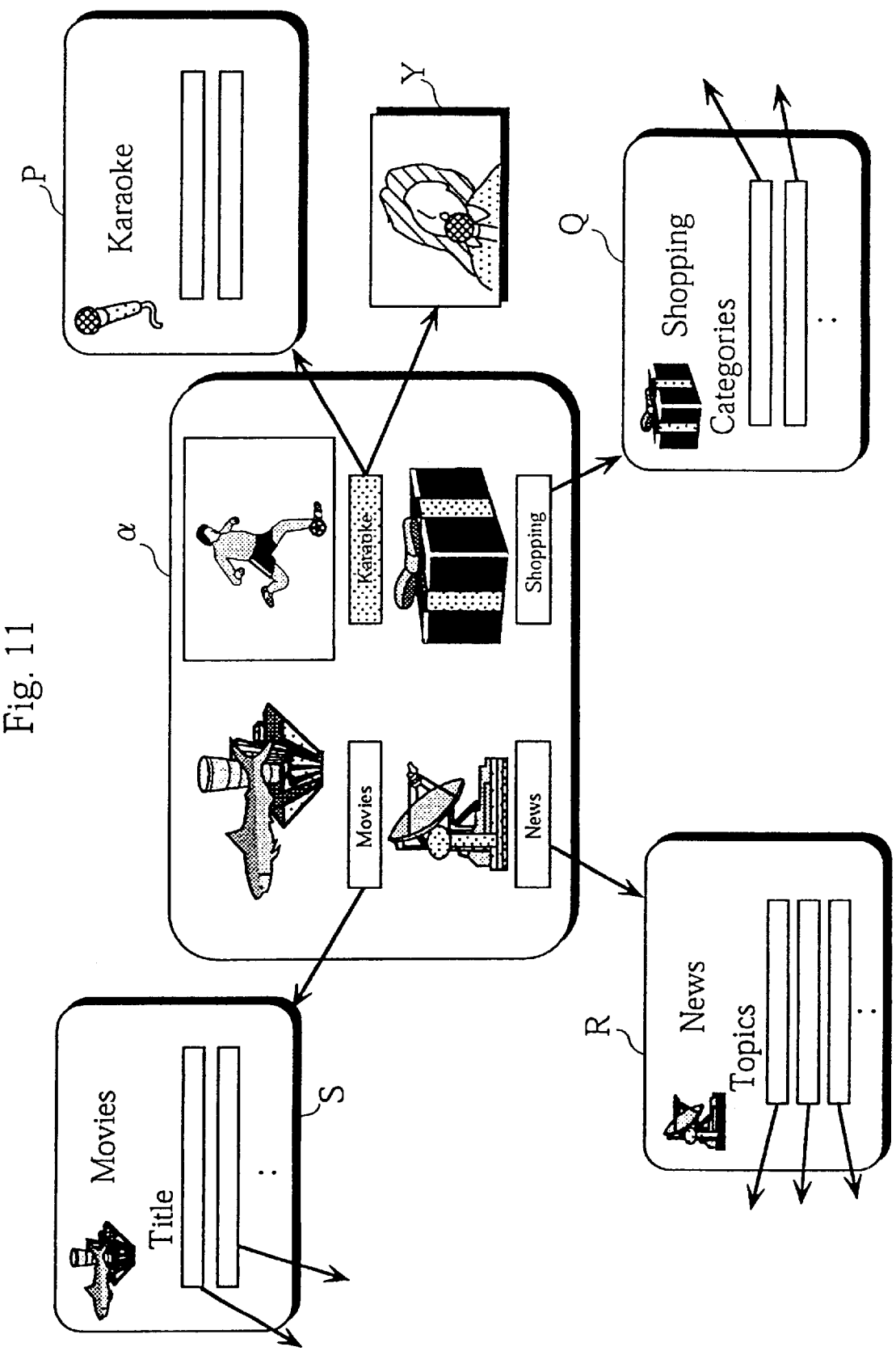
FIG. 11 shows the relationship between the page object shown in FIG. 9 and the page object screens that can be requested.
Figure 12:
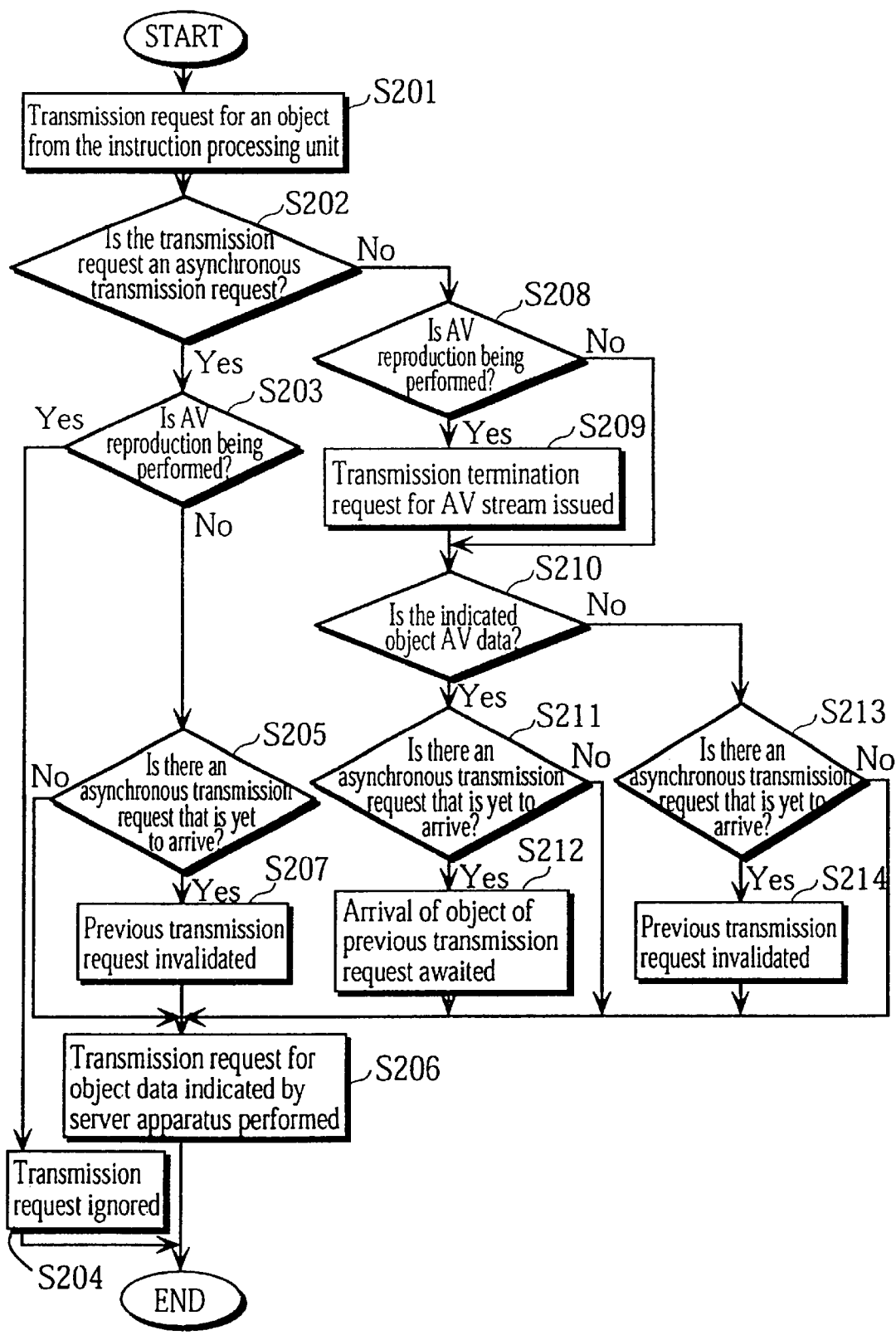
FIG. 12 is a flowchart showing the operation of the transmission request processing in a data reception terminal.

A representation of the relationship between the objects requested by synchronous transmission requests and asynchronous transmission requests is given in FIG. 11. FIG. 12, meanwhile, a flowchart showing the operation of the data reception terminal 2 in accordance with a synchronous transmission request, an asynchronous transmission request, and the present reception status.

Step 201

The instruction processing unit 26 interprets the control instruction stored in the data storage unit 23 and the indications received from the input reception unit 25 and, on finding an object transmission request to be issued to the server apparatus 1, has the request transmission unit 27 perform the following steps to issue a transmission request or a transmission termination request.

Step 202

The instruction processing unit 26 judges whether the instruction statement is an asynchronous transmission request and has the following processes performed when this is the case.

Steps 203, 204

When the transmission request is an asynchronous transmission request and AV data is being outputted by the video/audio reproduction unit 24 and reproduced, since there is only a data channel for one stream provided between the server apparatus 1 and each data reception terminal 2 and the data transmission communication unit 32 is busy with the transmission of the AV data, data transmission cannot be performed and the transmission request is ignored. As one example, for the screen shown in FIG. 9, if the user of the data reception terminal 2 moves the cursor to select the "Shopping" service, an asynchronous transmission request is issued for the page object Q that needs to be transmitted when the presently selected service "Shopping" is confirmed. However, if, for example, the vide 508 is being reproduced, the instruction processing unit 26 will ignore this asynchronous transmission request.

Steps 205, 206, 207

When the transmission request is an asynchronous transmission request, but a different asynchronous transmission request is already being performed and the object requested by this previous asynchronous transmission request has not yet arrived, the instruction processing unit 26 has the request transmission unit 27 issue a transmission termination request for the object requested by the previous asynchronous transmission request and a new asynchronous transmission request for the present asynchronous transmission request to give it priority. When there are not objects that are yet to arrive for preceding asynchronous transmission requests, the instruction processing unit 26 has the request transmission unit 27 issue an asynchronous transmission request as normal.

Using the same example, when the vide 508 is not being reproduced and the user moves the cursor from the "Movies" service to select the "News" service, an asynchronous transmission request should be executed for the object R whose transmission becomes necessary when the service "News" has been confirmed, although an asynchronous transmission request will be performed for the object S whose transmission would have become necessary had the service "Movies" been confirmed. In such case, the object corresponding to the service "Movies" is not longer necessary, so that the instruction processing unit 26 has the request transmission unit 27 issue a transmission termination request for the object S corresponding to the service "Movies" and has the request transmission unit 27 issue an asynchronous transmission request for the object R corresponding to the service "News".

When the screen show in FIG. 9 first appears, or when the object requested by the previous synchronous transmission request has already arrived, there is no need to issue a transmission termination request, so that the instruction processing unit 26 has the request transmission unit 27 immediately issue an asynchronous transmission request.

By requesting in advance the transmission of an object which is believed to have the greatest probability of being required next and storing the object in the data storage unit 23, the necessary object R will have already been stored in the data storage unit 23 before the user confirms the selection of the service "News", so that processing for changing the display can be performed immediately.

Steps 208, 209

When the transmission request is a synchronous transmission request and AV data is being outputted by the video/audio reproduction unit 24 and reproduced, since a synchronous transmission request is a transmission request for an object which is necessary now, the instruction processing unit 26 has the request transmission unit 27 issue a transmission termination request for the AV data that is currently being reproduced to free the capacity of the data transmission communication unit 32 taken up by the current AV data. As one example, when the user of the data reception terminal 2 confirms a selection of the "Karaoke" service, the instruction processing unit 26 has the request transmission unit 27 issue a transmission termination request to stop the transmission of AV data for the video 508 whose reproduction should be stopped.

Steps 210, 211, 212

When the object for which a synchronous transmission request is issued is an object that includes AV data and an asynchronous transmission request has already been issued but the object requested by the asynchronous transmission request has not yet arrived at the data reception terminal 2, the capacity of the communication circuits will be entirely used one the transmission of the AV data starts, so that the instruction processing unit 26 waits for the previously requested object to arrive and then has the request transmission unit 27 issue a transmission request for the AV data. As one example, when the user of the data reception terminal 2 moves the cursor to select the service name "Karaoke", an asynchronous transmission request will be issued for the object P that will need to be transmitted when the selection is confirmed. After this, the system is set to issue a synchronous transmission request for AV data Y for reproducing video that is different to the present video 508. As a result, if the user of the data reception terminal 2 moves the cursor to select the service "Karaoke", the synchronous transmission request for the AV data Y will not be issued until the object P requested by the asynchronous transmission request has arrived. By doing so, the system can quickly obtained the object which will most probably be selected.

Steps 212, 213

When the object requested by the synchronous transmission request is private data and an asynchronous transmission request has already been issued but the object requested by the asynchronous transmission request has not yet arrived at the data reception terminal 2, the instruction processing unit 26 has the request transmission unit 27 issue a transmission termination request to terminate the transmission request to give priority to the synchronous transmission request. As one example, when the user moves the cursor from the "Movies" service to the "News" service and immediately confirms the selection of "News", an asynchronous transmission request will have been issued for the object S that is to be reproduced when the service "Movies" is confirmed,. In this case the object S corresponding to the service "Movies" is no longer required, so that the instruction processing unit 26 has the request transmission unit 27 issue a transmission termination request for the object S corresponding to the service "Movies", before having the request transmission unit 27 issue a synchronous transmission request for the first page object R corresponding to the service "News". This concludes the explanation of the operation of the data reception terminal 2 based on the asynchronous transmission requests, synchronous transmission requests, and present reception status.

It should be noted here that the above processing can be modified, so that in step 212, the data reception terminal 2 need not wait for the object requested by the previous asynchronous transmission request to arrive, and may instead transmit a transmission termination request for this object to the server apparatus 1.

In step 204, the data reception terminal 2 was described as ignoring asynchronous transmission requests when AV data is being reproduced, although it is also possible for the data reception terminal 2 to instruct the server apparatus 1 to transmit the object of the asynchronous transmission request via the control communication unit 31.

In steps 209 onwards, it is possible for the data reception terminal 2 to instruct the server apparatus 1 to transmit the private data via the control channel of the control communication unit 31 when AV data is being reproduced.

It is also possible, during the reproduction of AV data, for the private data to be transmitted via the control channel of the control communication unit 31 when the data channel of the data transmission communication unit 32 is occupied based on a judgement made by the server control unit 12 of the server apparatus 1.

Figure 13:
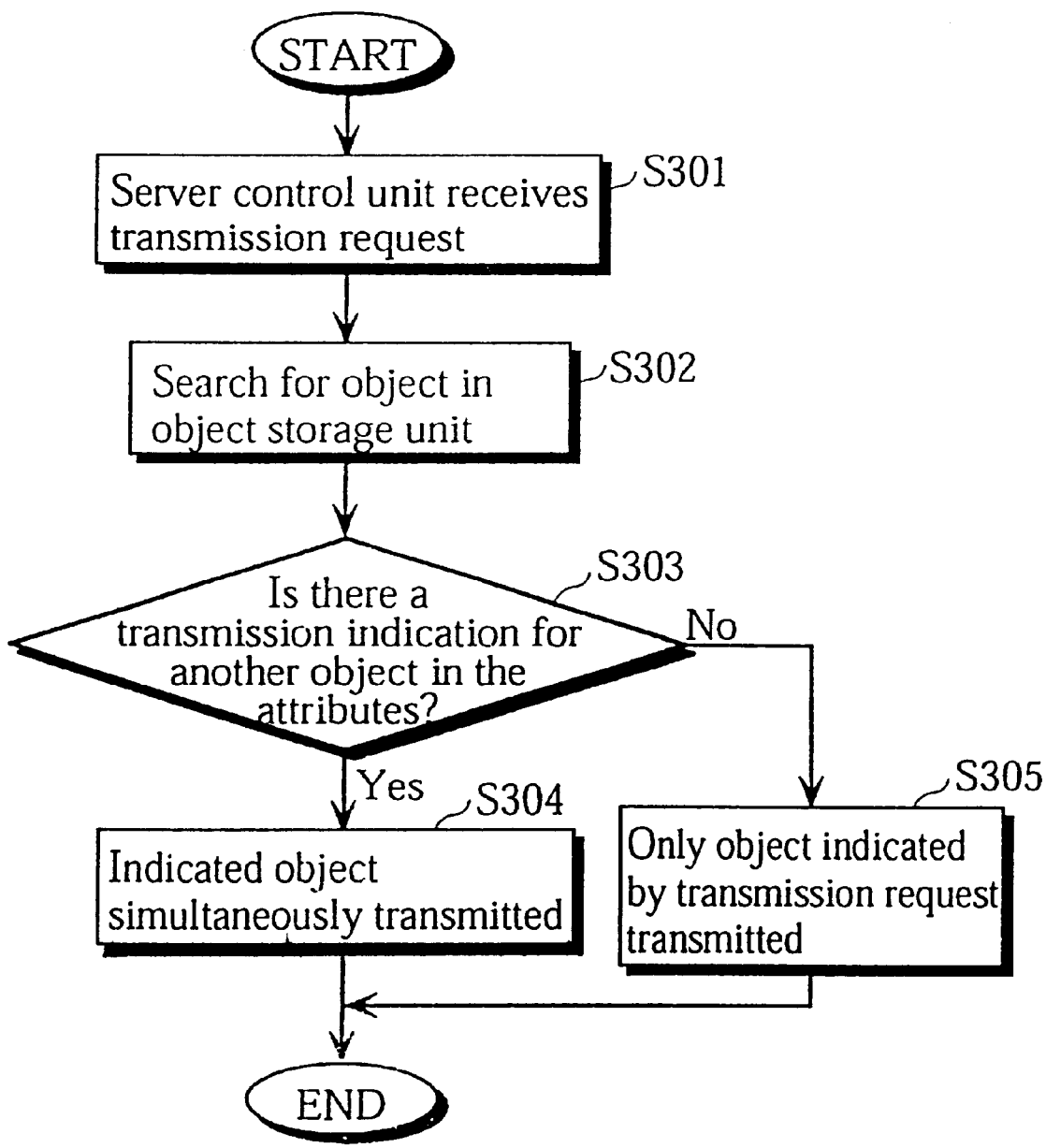
FIG. 13 is a flowchart showing the operation of the server apparatus after receiving a transmission request.

The following is an explanation of when the transmission of an object that includes list information (hereinafter, such objects will be referred to as "compound objects"). First, the operation of the server apparatus 1 will be described with reference to FIG. 13, which is a flowchart showing the operation of the server apparatus 1 when a transmission request for a compound object has been received.

Steps 301, 302

The server control unit 12 receives an object transmission request from the request transmission unit 27 of the data reception terminal 2, and searches for the requested object in the object storage unit 11.

Steps 303, 304, 305

The server control unit 12 judges whether the object it has found has attribute information data that includes list information, and if the attribute information data includes list information, transmits the requested objected and the objects recorded in the list information to the data reception terminal 2. On the other hand, if the requested object does not include list information, the server apparatus 1 transmits only the requested object to the data reception terminal 2. As one example, when the server control unit 12 finds the object "page 1" shown in FIG. 6, the server control unit 12 finds that the object "audio1" is present as an attached object in the attribute information data 302, so that the server control unit 12 finds the object "audio1" and transmits it together with the object "page1" to the data reception terminal 2. As a different example, when there is no list information 307 in the attribute information data 302, the server control unit 12 only transmits the requested object "page1" to the data reception terminal 2.

Figure 14:
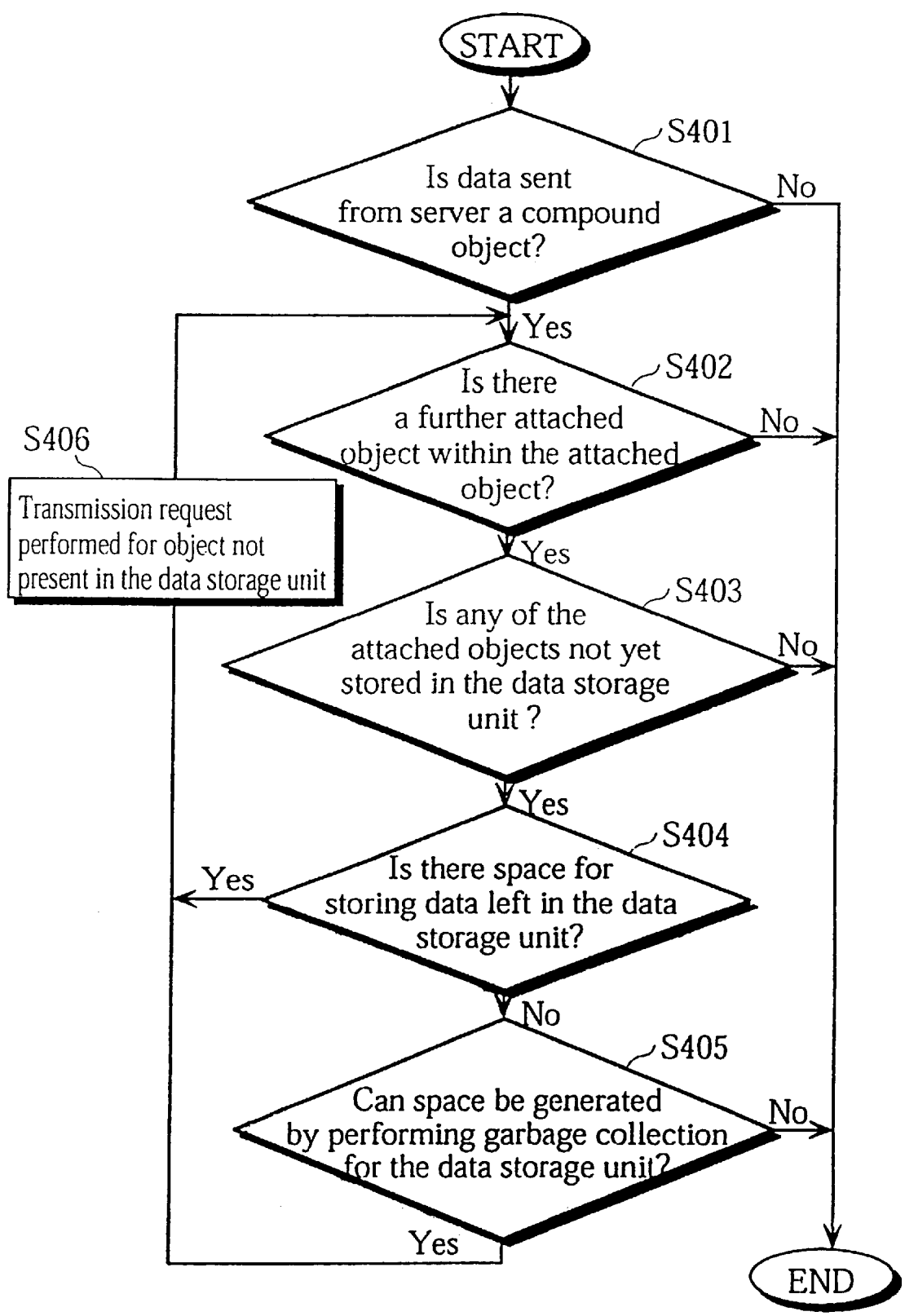
FIG. 14 is a flowchart showing the operation of the data reception apparatus after receiving a compound object.

The following is an explanation of the operation of the data reception terminal 2 on receiving a compound object, in accordance with the flowchart in FIG. 14.

Step 401

When an object is transmitted from the server apparatus 1, the instruction processing unit 26 of the data reception terminal 2 judges whether the received object is a compound object. This judgement may be performed by having a list of object names provided at the start of each set of object data that shows the object name of the present object and the object names given in the list information, with the instruction processing unit 26 of the data reception terminal 2 then judging whether there are a plurality of object names in this list. For the example shown in FIG. 15, the object with the object name "PageA" having the attribute information table 901 which includes "Audio1, PageB" as the list information can have a list of objects such as ("PageA", "Audio1, PageB"), so that the instruction processing unit 26 may then judge that this object is a compound object. It should be noted here that in this case, the attached objects with the object names "Audio1", "PageB" will also be transmitted to the data reception terminal 2 by the server apparatus 1.

Step 402

Figure 15:
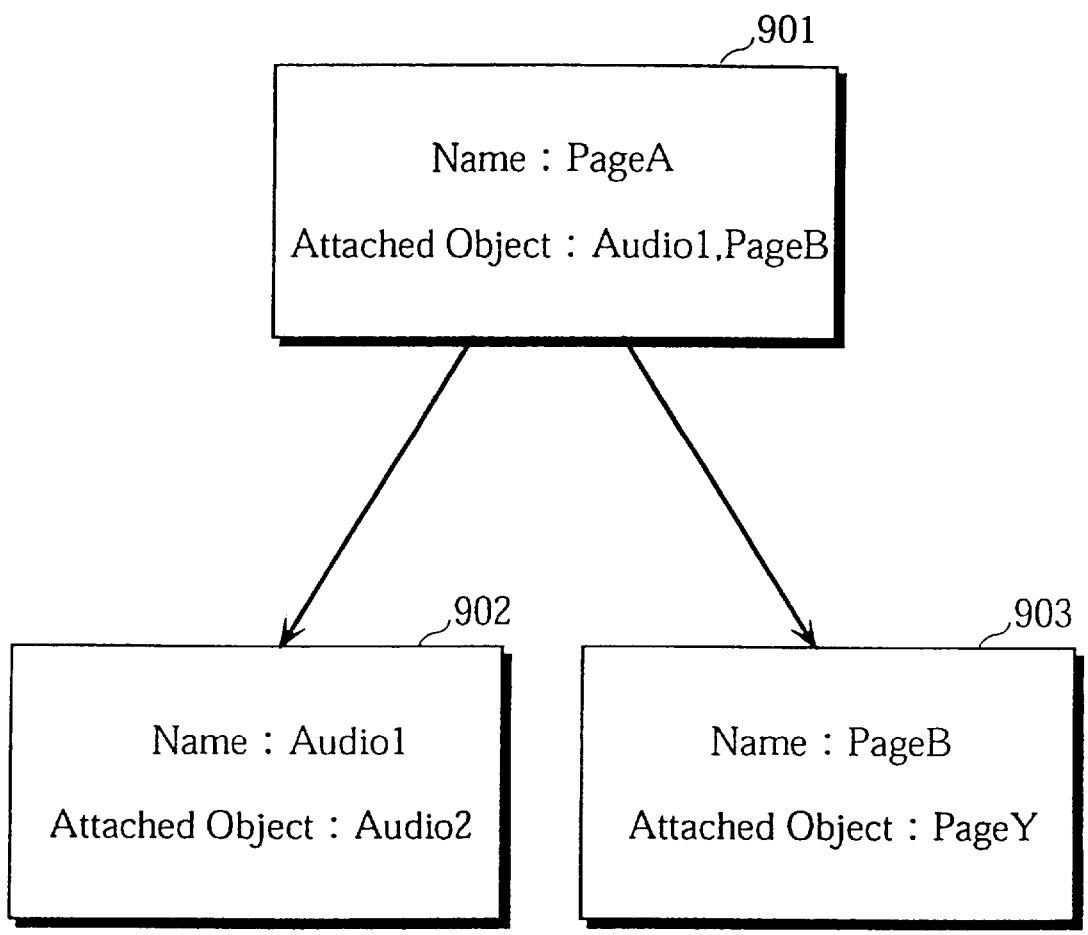
FIG. 15 shows the attribute information data of a compound object and an attached object.

When the transmitted object is a compound object, the instruction processing unit 26 confirms whether the attached objects themselves include list information. When the attached objects include list information, the processing described below is performed, or otherwise the processing is terminated. As one example, when the object "PageA" with the attribute information table shown in FIG. 15 is transmitted, this object includes the objects "Audio1" and "PageB" as attached objects in the list information. The instruction processing unit 26 accordingly searches the attribute list information 902 and 903 of these attached objects to see if they include list information. As a result, the instruction processing unit 26 finds that the attribute list information 902 includes the list information "AttachedObject:Audio2" and the attribute list information 903 includes the list information "AttachedObject:PageY", so that the processing described below is performed.

Step 403

When an attached object itself includes list information, the instruction processing unit 26 confirms whether an object listed in this list information has already been stored in the data storage unit 23. When all of the objects listed in the list information have already been stored in the data storage unit 23, the instruction processing unit 26 terminates the processing. If this is not the case, the instruction processing unit 26 performs the processing described below.

Figure 16:
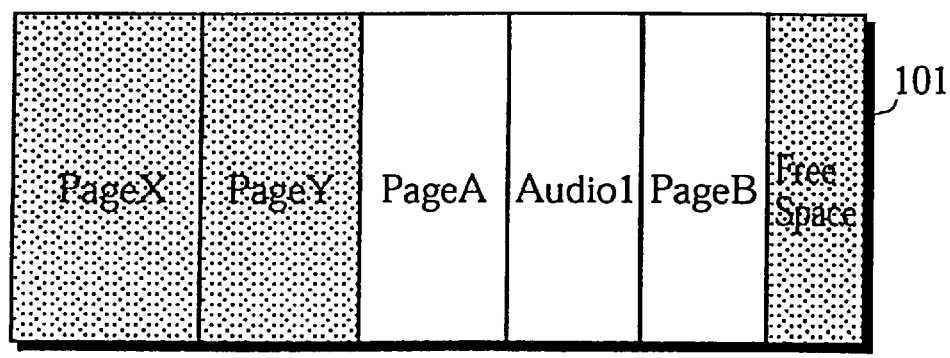
FIG. 16 shows an example of the storage arrangement of the data storage unit.

As one example, the instruction processing unit 26 confirms whether the objects "Audio2", "PageY" listed in the list information of the attached objects that have the attribute information data 902, 903 shown in FIG. 15 are already stored in the data storage unit 23. At this point, the stored content of the data storage unit 23 is as shown in FIG. 16. In FIG. 16, the rectangular region 101 represents the entire storage capacity of the data storage unit 23. With the data storage unit 23 in the illustrated state, "PageY" can be seen to have been stored in the data storage unit 23 as a result of earlier processing, while "Audio2" is not present in the data storage unit 23. In such a case, the processing described below is performed.

Steps 404, 405, 406

When an object listed in the list information of an attached object is yet to be stored in the data storage unit 23, the instruction processing unit 26 confirms whether there is sufficient free space in the data storage unit 23 to store the object in question. When there is insufficient free space in the data storage unit 23, the instruction processing unit 26 deletes unnecessary objects from the data storage unit 23 in a process called "garbage collection". When there is sufficient free space in the data storage unit 23, or when sufficient free space has been generated as a result of garbage collection, the instruction processing unit 26 has the request transmission unit 27 issue a transmission request for the object in question. When garbage collection is unable to generate sufficient free space, the processing is terminated.

As one example, when the attached objects are objects with the attribute list information 902, 903 shown in FIG. 15 and the storage state of the data storage unit 23 is as shown in FIG. 16, the object "Audio2" given in the list information of the object "Audio1" as an attached object is yet to be stored in the data storage unit 23, so that the instruction processing unit 26 first investigates whether there is sufficient free space in the data storage unit 23 to store the object "Audio2". When the storage content of the data storage unit 23 is as shown in FIG. 16, the instruction processing unit 26 estimates that there is insufficient free space, and so deletes the unnecessary objects in the data storage unit 23. In the present case, the unnecessary objects in the data storage unit 23 are the objects "PageX" and "PageY", although, since the object "PageY" is listed in the list information of the attached object "PageB", the instruction processing unit 26 deletes only the object "PageX" to increase the free space in the data storage unit 23. Since sufficient free space is now maintained by the data storage unit 23, the instruction processing unit 26 instructs the request transmission unit 27 to issue a transmission request for the object "Audio2". In this way, the instruction processing unit 26 manages the storage of the data storage unit 23 by reading sets of attribute information in advance.

The instruction processing unit 26 performs the same processing for the attached objects of each transmitted object, provided there is sufficient free space in the data storage unit 23.

Figure 17:
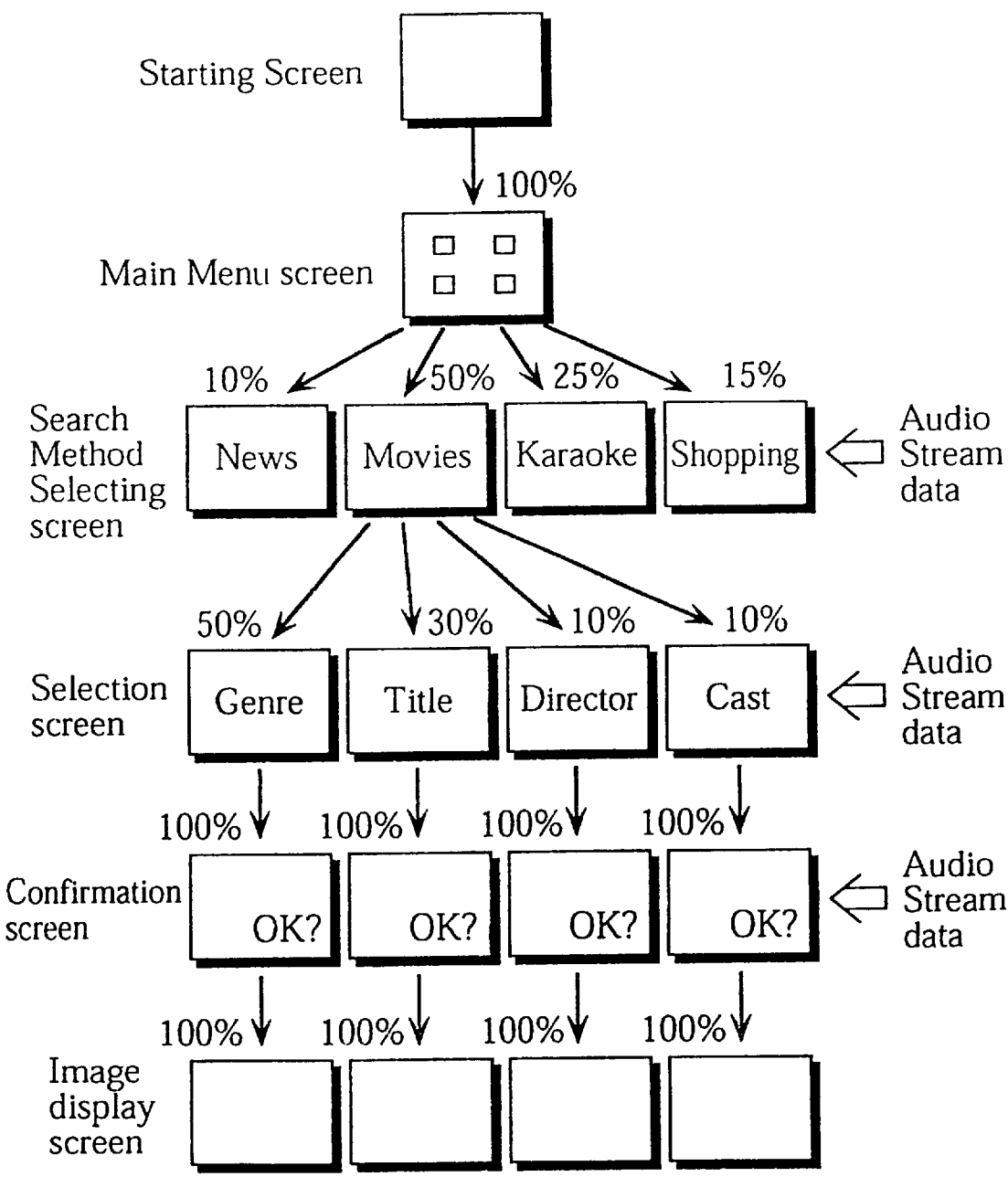
FIG. 17 is a representation of an example of the changes in the display screen of the data reception terminal 2 from the starting screen until an image display screen that reproduces a movie selected in accordance with user operations.

The following is a description of the actual effect of performing the processing described above. Here, FIG. 17 is a representation of an example transformation in the display outputted by the data reception terminal 2 from the starting screen until an image display screen that reproduces a movie selected in accordance with user operations. The following example describes the effect of the present invention in relation to a case when the present invention is not used.

In the example shown in FIG. 17, after the display has automatically switched from the "starting screen" to the "main menu screen" for selecting a main menu, the user makes a selection of "movies", so that the "search method selecting screen" for selecting a search method for "Movies" is displayed. The display then switches to a "selection screen" in accordance with the user's indication of a search key, and when the user indicates a specific movie, a "confirmation screen" for confirming the user's selection is automatically displayed. When the user confirms the selection, the screen switches to the "image display screen" and the selected movie is reproduced. In the "search method selecting screen", "selection screen", and "confirmation screen", objects that include different sets of audio stream data as private data require separate objects to the objects used to form the screen.

The following is a calculation of an estimate of the total waiting time which is composed of access time and data transfer waiting time which is composed of access time and data transfer time when, as described in the prior art, only synchronous transmission requests are possible and attached objects are not used. From actual observation, the average access time for such a system is around four seconds, and if the data transfer speed is set at 2.4 Mpbs, then the average transfer time will be around two seconds, meaning that the average wait time for one access will be around six seconds. In the present example, five accesses need to be performed to request the objects for forming the five display screens, while the "search method selecting screen", "selection screen", and "confirmation screen" further require three accesses for the information of the objects including the audio stream data. As a result, the switching of screens described above will require a total of eight accesses. For a conventional system, this would result in a total waiting time T0 given as T0=8*6=48 seconds.

The total waiting time when asynchronous transmission requests and attached objects are possible is given below. In FIG. 17, the numbers written next to each screen are the probabilities with which the screen in question will be displayed. In this case, objects for displaying screens with a high probability of being displayed can be requested beforehand using asynchronous transmission requests. As a result, an asynchronous transmission request for the "main menu screen" is given during the "starting screen", an asynchronous transmission request for the "search method selecting screen" for "Movies" is given during the "main menu screen", asynchronous transmission requests for the "selection screen" for "Genre" and for "Title" are given during the "search method selecting screen" for "Movies", and an asynchronous transmission request for the "confirmation screen" is given during the "selection screen". The objects used for forming the "search method selecting screen", "selection screen", and "confirmation screen" are also set as objects that include the audio stream data as attached objects.

In such a case, the average waiting time when switching display is as follows.

Switching from "starting screen" to "main menu screen".

$$T1=0*1.0=0 \text{ seconds}$$

Switching from "main menu screen" to "search method selecting screen".

$$t2=0*0.5+6*(0.1+0.15|0.25)=3 \text{ seconds}$$

Switching from "search method selecting screen" to "selection screen".

$$t3=0*(0.5|0.3)+6*(0.1+0.1)-1.2 \text{ seconds}$$

Switching from "selection screen" to "confirmation screen".

$$t4=0*1.0=0 \text{ seconds}$$

Switching from "confirmation screen" to "image display screen".

$$t5=6*1.0-6 \text{ seconds}$$

Since it is no longer necessary to issue an object transmission request for objects that include audio stream data, the required number of accesses is five, which the total waiting time Tn being as follows.

$$Tn-t1+t2+t3|t4|t5=10.2 \text{ seconds}$$

Accordingly, the total average wait time for the start of reproduction of a movie can be reduced from 48 seconds to 10.2 seconds using the present invention, which is a sizable reduction over the prior art.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A data reception terminal apparatus connected via a control channel and a data channel of a network means to a server apparatus that stores a plurality of objects including at least one object that contains control instructions, the data reception terminal apparatus comprising:

object reception means for receiving an object;

data storage means for storing data included in the received object;

request transmission means for issuing one of an object transmission request and a transmission termination request via the control channel of the network to the server apparatus;

input reception means for receiving a user indication; and instruction processing means for decoding one of the user indication received by the input reception means and a control instruction included in the data stored in the data storage means, and for having the request transmission means issue an object transmission request after judging from a decoding result that one of an asynchronous transmission request and a synchronous transmission request should be executed, wherein a synchronous transmission request is a transmission request for having an object transmission request issued to the server apparatus with a next decoding not being performed until an object requested by the object transmission request is received, and an asynchronous transmission request is a transmission request for having an object transmission request issued to the server apparatus with decoding the next control instruction included in the data already stored in the data storage means regardless of whether the requested object by the object transmission request has been received or not.

2. The data reception terminal apparatus of claim 1, wherein at least one object in the plurality of objects stored by the server apparatus includes at least one of video data and audio data, and the data reception terminal apparatus further comprises:

video/audio data reproduction means for reproducing video data and audio data; and data identification means for identifying whether data in the object received by the object reception means contains at least one of video data and audio data, for outputting the received one of video data and audio data to the video/audio data reproduction means, and for outputting other data to the data storage unit.

3. The data reception terminal apparatus of claim 2, wherein on decoding one of a user indication and a control instruction and finding that a synchronous transmission request should be executed while at least one of video data and audio data are being reproduced by the video/audio data reproduction means, the instruction processing means has the request transmission means issue a transmission termination request for an object that includes the one of video data and audio data being reproduced by the video/audio data reproduction means to the server apparatus.

4. The data reception terminal apparatus of claim 2, wherein on decoding one of a user indication and a control instruction and finding that an asynchronous transmission request should be executed while at least one of video data and audio data are being reproduced by the video/audio data reproduction means, the instruction processing mean does not have the request transmission means execute the asynchronous transmission request.

5. The data reception terminal apparatus of claim 2, wherein when the request transmission means has issued an asynchronous transmission request to the server apparatus but a requested object has not yet arrived at the data reception terminal apparatus and, on decoding one of a user indication and a control instruction, the instruction processing means finds that a transmission request should be issued for an object including at least one of video data and audio data, the instruction processing means first has the request transmission means issue a transmission termination request for the requested object of the asynchronous transmission request.

6. The data reception terminal apparatus of claim 2, wherein when the request transmission means has issued a first asynchronous transmission request to the server apparatus but a requested object has not yet arrived at the data reception terminal apparatus and, on decoding one of a user indication and a control instruction, the instruction processing means finds that a second asynchronous transmission request should be issued, the instruction processing means first has the request for the requested object of the first asynchronous transmission request.

7. The data reception terminal apparatus of claim 2, wherein when the request transmission means has issued an asynchronous transmission request to the server apparatus but a requested object has not yet arrived at the data reception terminal apparatus and, on decoding one of a user indication and a control instruction, the instruction processing means finds that a transmission request should be issued for an object that includes at least one of video data and audio data, the instruction processing means does not have the request transmission means issue the transmission request until the requested object of the asynchronous transmission request has arrived.

8. The data reception terminal apparatus of claim 2, wherein the object reception means is able to receive an object on the control channel of the network means, and when at least one of video data and audio data are being reproduced by the video/audio data reproduction means and the request transmission means has issued an object transmission request, the object reception means receives an object requested by the object transmission request on the control channel of the network means.

9. A data reception method for issuing a transmission request for an object via a control channel of a network means to a server apparatus and receiving the requested object via a data channel of the network means, the server apparatus storing a plurality of objects that include at least one object that contains control instructions, the control instructions including a control instruction for issuing a synchronous transmission request and a control instruction for issuing an asynchronous transmission request, the reception method comprising:

an object reception step for receiving an object from the server apparatus, wherein the object includes one of a control instruction for issuing a synchronous transmission request and a control instruction for issuing an asynchronous transmission request;

an instruction decoding step for decoding the control instruction included in the object received in the object reception step and judging whether the control instruction is a synchronous transmission request or an asynchronous transmission request;

a synchronous processing step for issuing, when the instruction decoding step judges that the control instruction is a synchronous transmission request, a transmission request for an object and keeping the instruction decoding step from decoding the next control instruction included in the already received object until the object requested by the issued transmission request arrives; and an asynchronous processing step for issuing, when the instruction decoding step judges that the control instruction is an asynchronous transmission request, a transmission request for an object and having the instruction decoding step decode the next instruction included in the already received object regardless of whether the object requested by the issued transmission request has arrived or not.

10. The data reception method of claim 9, wherein the plurality of objects also includes at least one object that contains at least one of video data and audio data, and wherein the data reception method further comprises:

a video/audio judging step for judging whether data in the object received from the server apparatus is one of video data and audio data; and a transmission termination requesting step for sending, when the video/audio judging step judge that the data in the received object is one of video data and audio data and the instruction decoding step judges that the control instruction is a synchronous transmission request, a request to terminate a transmission of the received object to the server apparatus.

11. The data reception method of claim 9, wherein the plurality of objects also includes at least one object that contains at least one of video data and audio data, and wherein the data reception method further comprises:

a video/audio judging step for judging whether data in the object received from the server apparatus is one of video data and audio data; and an asynchronous transmission discarding step for discarding, when the video/audio judging step judges that the data in the object received from the server apparatus is one of video data and audio data and the instruction decoding step judges that the control instruction is an asynchronous transmission request, the asynchronous transmission request.

12. The data reception method of claim 9, wherein the plurality of objects also includes at least one object that contains at least one of video data and audio data, and wherein the data reception method further comprises:

a first asynchronous transmission request terminating step for transmitting, when an object requested by an asynchronous transmission request has not yet to arrived and the instruction decoding step judges that the control instruction is a transmission request for an object that includes at least one of video data and audio data, a request to the server apparatus to terminate a transmission of the object that has not yet arrived.

13. The data reception method of claim 9, further comprising:

a second asynchronous transmission request terminating step for transmitting, when an object requested by an asynchronous transmission request has not yet arrived and the instruction decoding step judges that the control instruction is an asynchronous transmission request, a request to the server apparatus to terminate a transmission of the object that has not yet arrived.

14. The data reception method of claim 9, wherein the plurality of objects also includes at least one object that contains at least one of video data and audio data, and wherein the data reception method further comprises:

a transmission request waiting step for waiting, when an object requested by an asynchronous transmission request has not yet arrived and the instruction decoding step judges that a transmission request for an object that contains at least one of video data and audio data is to be issued, for the object requested by the asynchronous transmission request to arrive before issuing the transmission request for the object that contains at least one of video data and audio data.

15. The data reception method of claim 9, wherein the plurality of objects also includes at least one object that contains at least one of video data and audio data, and wherein the data reception method further comprises:

a video/audio judging step for judging whether data in the object received from the server apparatus is one of video data and audio data; and a reception channel changing step for receiving, when the data in the object received from the server apparatus is judged as being one of video data and audio data and the instruction decoding step judges that the control instruction is one of an asynchronous transmission request and a synchronous transmission request, an object requested by the one of the asynchronous transmission request and the synchronous transmission request via a control channel of the network means.

16. A computer-readable recording medium for storing a program to be executed by a computer that is connected to a server apparatus that stored a plurality of objects, the program having the computer execute a procedure for issuing a transmission request for an object via a control channel of a network means and receiving the requested object via a data channel of the network means, the plurality of objects stored by the server apparatus including at least one object that contain one of a control instruction for issuing a synchronous transmission request for an object and a control instruction for issuing an asynchronous transmission request;

the procedure including the following steps:

an object reception step for receiving an object from the server apparatus, wherein the object contains one of a control instruction for issuing a synchronous transmission request and a control instruction for issuing an asynchronous transmission request;

an instruction decoding step for decoding the decoding the control instruction contained in the object received in the object reception step and judging whether the control instruction is a synchronous transmission request or an asynchronous transmission request;

a synchronous processing step for issuing, when the instruction decoding step judges that the control instruction is a synchronous transmission request, a transmission request for an object and keeping the instruction decoding step from decoding the next control instruction included in the already received object until the object requested by the issued transmission request arrives; and an asynchronous processing step for issuing, when the instruction decoding step judges that the control instruction is an asynchronous transmission request, a transmission request for an object and having the instruction decoding step decode the next instruction included in the already received object regardless of whether the object requested by the issued transmission request has arrived or not.

17. The recording medium of claim 16, wherein the plurality of objects also includes at least one object that contains at least one of video data and audio data, and wherein the procedure further comprises:

a video/audio judging step for judging whether data in the object received from the server apparatus is one of video data and audio data; and a transmission termination requesting step for sending, when the video/audio judging step judges that the data in the received object is one of video data and audio data and the instruction decoding step judges that the control instruction is a synchronous transmission request, a request to terminate a transmission of the received object to the server apparatus.

18. The recording medium of claim 16, wherein the plurality of objects also includes at least one object that contains at least one of video data and audio data, and wherein the procedure further comprises:

a video/audio judging step for judging whether data in the object received from the server apparatus is one of video data and audio data; and an asynchronous transmission discarding step for discarding, when the video/audio judging step judges that the data in the object received from the server apparatus is one of video data and audio data and the instruction decoding step judges that the control instruction is an asynchronous transmission request, the asynchronous transmission request.

19. The recording medium of claim 16,
wherein the plurality of objects also includes at least one object that contains at least one of video data and audio data,
and wherein the procedure further comprises:
a first asynchronous transmission request terminating step for transmitting, when an object requested by an asynchronous transmission request has not yet arrived and the instruction decoding step judges that the control instruction is a transmission request for an object that includes at least one of video data and audio data, a request to the server apparatus to terminate a transmission of the object that has not yet arrived.

20. The recording medium of claim 16, wherein the procedure further comprises:
a second asynchronous transmission request terminating step for transmitting, when an object requested by an asynchronous transmission request has not yet arrived and the instruction decoding step judges that the control instruction is an a synchronous transmission request, a request to the server apparatus to terminate a transmission of the object that has not yet arrived.

21. The recording medium of claim 16,
wherein the plurality of objects also includes at least one object that contains at least one of video data and audio data,
and wherein the procedure further comprises:
a transmission request waiting step for waiting, when an object requested by an asynchronous transmission request has not yet arrived and the instruction decoding step judges that a transmission request for an object that includes at least one of video data and audio data is to be issued, for the object requested by the asynchronous transmission request to arrive before issuing the transmission request for the object that includes at least one of video data and audio data.

22. The recording medium of claim 16,
wherein the plurality of objects also includes at least one object that contains at least one of video data and audio data,
and wherein the procedure further comprises:
a video/audio judging step for judging whether data in the object received from the server apparatus is one of video data and audio data; and
a reception signal changing step for receiving, when the data in the object received from the server apparatus is judged as being one of video data and audio data and the instruction decoding step judges that the control instruction is one of an asynchronous transmission request and a synchronous transmission request, an object requested by the one of the asynchronous transmission request and the synchronous transmission request via a control channel of the network means.

23. A data reception terminal apparatus connected via a network channel to a server apparatus that stores a plurality of objects including at least one object that contains control instructions,
the data reception terminal apparatus comprising:
object reception unit for receiving an object from the server apparatus;
data storage unit for storing data included in the received object;
request transmission unit for issuing one of an object transmission request and a transmission termination request to the server apparatus;
input reception unit for receiving an object in accordance with a user indication; and
instruction processing unit for decoding one of the objects in accordance with the user indication received by the input reception unit and a control instruction included in the data stored in the data storage unit, and for having the request transmission unit issue an object transmission request and a synchronous transmission request should be executed,
wherein a synchronous transmission is a transmission request for having an object transmission request issued to the server apparatus with a next decoding not being performed until an object requested by the object transmission request is received, and an asynchronous transmission request is a transmission request for having an object transmission request issued to the server apparatus with decoding the next control instruction included in the data already stored in the data storage unit regardless of whether the requested object by the object transmission request has been received or not.

24. The data reception terminal apparatus of claim 23, wherein at least one object in the plurality of objects stored by the server apparatus includes at least one of video data and audio data, and the data reception terminal apparatus further comprises:
video/audio data reproduction unit for reproducing video data and audio data; and
data identification unit for identifying whether data in the object received by the object reception unit contains at least one of video data and audio data, for outputting the received one of video data and audio data to the video/audio data reproduction unit, and for outputting other data to the data storage unit.

25. The data reception terminal apparatus of claim 24, wherein on decoding one of a user indication and a control instruction and finding that a synchronous transmission request should be executed while at least one of video data and audio data are being reproduced by the video/audio data reproduction means, the instruction processing unit has the request transmission unit issue a transmission termination request for an object that includes the one of video data and audio data being reproduced by the video/audio data reproduction unit to the server apparatus.

26. The data reception terminal apparatus of claim 24, wherein on decoding one of a user indication and a control instruction and finding that an asynchronous transmission request should be executed while at least one of video data and audio data are being reproduced by the video/audio data reproduction unit, the instruction processing unit does not enable the request transmission unit to execute the asynchronous transmission request.

27. The data reception terminal apparatus of claim 24, wherein when the request transmission unit has issued an asynchronous transmission request to the server apparatus but a requested object has not yet arrived at the data reception terminal apparatus and, on decoding one of a user indication and a control instruction, the instruction processing means finds that a transmission request should be issued for an object including at least one of video data and audio data, the instruction processing unit first has the request transmission unit issue a transmission termination request for the requested object of the asynchronous transmission request.

28. The data reception terminal apparatus of claim 24, wherein when the request transmission unit has issued a first asynchronous transmission request to the server apparatus but a requested object has not yet arrived at the data reception terminal apparatus and, on decoding one of a user indication and a control instruction, the instruction processing unit finds that a second asynchronous transmission request should be issued, the instruction processing unit first has the request transmission unit issue a transmission termination request for the requested object of the first asynchronous transmission request.

29. In a digital broadcasting network system including a server apparatus connected to a data reception terminal apparatus that includes a user interface for requesting data to be delivered by the server apparatus to the data reception terminal apparatus, the improvement comprising:

a determining unit for determining if the requested data from the data reception terminal apparatus is one of a synchronous transmission request to provide object data that is required to be decoded upon reception by the data reception terminal apparatus and an asynchronous transmission request to also provide object data that is predicted to be requested and would be subsequently decoded; and a server control unit, in the server apparatus, for loading object data, in response to an asynchronous transmission request, which is predicted to be requested to enable a subsequent transmission to the data reception terminal apparatus.

30. A computer-readable recording medium for storing a program to be executed by a computer that is connected to a server apparatus that stores a plurality of objects, the program having the computer execute a procedure for issuing a transmission request for an object via a control channel of a network means and receiving the requested object via a data channel of the network means, the plurality of objects stored by the server apparatus including at least one first object that contain one of a control instruction for issuing a synchronous transmission request and a control instruction for issuing an asynchronous transmission request, the procedure including the following steps:

an object reception step for receiving a first object from the server apparatus, wherein the first object contains one of a control instruction for issuing a synchronous transmission request and a control instruction for issuing an asynchronous transmission request;

an instruction decoding step for decoding the control instruction contained in the first object received in the object reception step and judging whether the control instruction is a synchronous transmission request or an asynchronous transmission request;

a synchronous processing step for issuing, when the instruction decoding step judges that the control instruction is a synchronous transmission request, a transmission request for a second object and not performing the instruction decoding step until the second object requested by the issued transmission request arrives; and an asynchronous processing step for issuing, when the instruction decoding step judges that the control instruction is an asynchronous transmission request, a transmission request for a third object and performing the instruction decoding step regardless of whether the third object requested by the issued transmission request has arrived or not.

31. The recording medium of claim 30, wherein the plurality of objects also includes at least one object that contains at least one of video data and audio data, and wherein the procedure further comprises:

a video/audio judging step for judging whether data in the object received from the server apparatus is one of video data and audio data; and a transmission termination requesting step for sending, when the video/audio judging step judges that the data in the received objects is one of video data and audio data and the instruction decoding step judges that the control instruction is a synchronous transmission request, a request to terminate a transmission of the received object to the server apparatus.

* * * * *